United States Patent [19]

Hehl

[11] Patent Number: 5,578,329
[45] Date of Patent: Nov. 26, 1996

[54] INJECTION MOLDING MACHINE FOR PROCESSING SYNTHETIC MATERIALS

[76] Inventor: Karl Hehl, Arthur-Hehl-Str. 32, D-72290 Lossburg, Germany

[21] Appl. No.: 215,471

[22] Filed: Mar. 21, 1994

[30] Foreign Application Priority Data

Mar. 20, 1993 [DE] Germany .................. 43 08 962.3
Apr. 24, 1993 [DE] Germany .................. 43 13 473.4

[51] Int. Cl.⁶ ............................................. B29C 45/64
[52] U.S. Cl. ................ 425/192 R; 100/214; 100/231; 425/450.1; 425/589; 425/593
[58] Field of Search ........................... 425/589, 592, 425/593, 595, 450.1, 451.5, 451.6, 451.9, 541, 190, 192 R; 100/214, 231, 258 A, 281

[56] References Cited

U.S. PATENT DOCUMENTS

| | | | |
|---|---|---|---|
| 2,266,129 | 12/1941 | Tegarty | 425/451.6 |
| 3,577,596 | 5/1971 | Bullard et al. | 425/151 |
| 3,704,973 | 12/1972 | Renfrew et al. | 425/150 |
| 3,787,165 | 1/1974 | Fischer et al. | 425/450.1 |
| 4,222,731 | 9/1980 | Enrietti et al. | 425/451.5 |
| 4,345,893 | 8/1982 | Prince | 425/595 |
| 4,421,472 | 12/1983 | Martin, Jr. | 425/450.1 |
| 5,033,955 | 7/1991 | Faig et al. | 425/450.1 |
| 5,249,951 | 10/1993 | Leonhartsberger et al. | 425/589 |
| 5,297,952 | 3/1994 | Leonhartsberger | 425/593 |
| 5,354,196 | 10/1994 | Ziv-Av | 425/589 |

FOREIGN PATENT DOCUMENTS

| | | |
|---|---|---|
| 372333 | 9/1983 | Austria . |
| 0427438 | 5/1991 | European Pat. Off. . |
| 0504580 | 9/1992 | European Pat. Off. . |
| 2516857 | 5/1983 | France . |
| 1116386 | 11/1961 | Germany . |
| 9212479 | 1/1993 | Germany . |
| 9212480 | 1/1993 | Germany . |
| 4230348 | 3/1993 | Germany . |
| 4141259 | 6/1993 | Germany . |

OTHER PUBLICATIONS

Patent Abstracts of Japan, vol. 14, No. 6 (M–916)(3949) Jan. 1990 & JP 1–255516.
Grundlagen des Maschinenbaues, "Band 1", A–Z, Patentanwalt Dipl.–Ing. Sauer Munchen–Solin, Deutsche Verlags–Anstalt Stuttgart, 1960, p. 394.

Primary Examiner—James P. Mackey
Attorney, Agent, or Firm—Spencer & Frank

[57] ABSTRACT

In an injection molding machine for processing synthetic materials a machine base is fixedly connected with a stationary mold carrier, with a movable mold carrier and with a closing mechanism, arranged at the closing mechanism, for moving the movable mold carrier. The supporting element is hinged with the stationary mold carrier by at least one force transmitting element adapted to take up forces occuring when the mold is in closed position. Since the force transmitting element is a separate clamping device, deformable by the forces, and the supporting element is movably beared at the machine base in closing direction, whereat linked elements, used for flexible connection are detachably arranged at the supporting element, the stationary mold carrier and the clamping device, it is achieved that deformations occuring at the mold closing unit are deviated to the machine base without having an influence on it, even after a long life and without affecting mold parallelism.

9 Claims, 23 Drawing Sheets

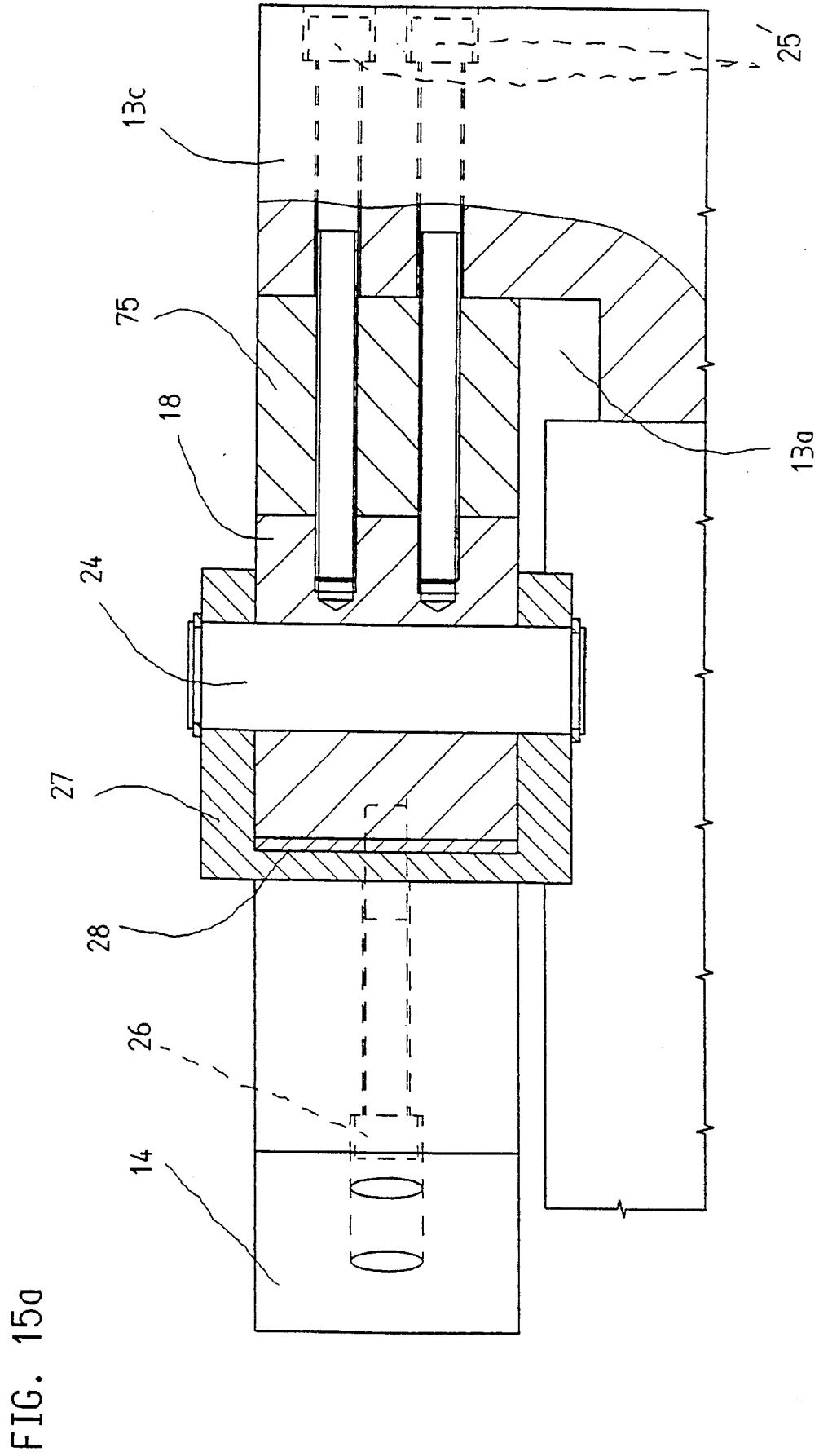

INJECTION MOLDING MACHINE FOR PROCESSING SYNTHETIC MATERIALS

CROSSREFERENCE TO RELATED APPLICATION

This application claims the priority of German Patent Application P 43 08 962.3, filed Mar. 20, 1993, and of German Patent Application P 43 13 473.4, filed Apr. 24, 1993, which are incorporated herein by reference

BACKGROUND OF THE INVENTION

1. Field of the Invention

This invention relates to an injection molding machine, particularly to an injection molding machine for processing synthetic materials, comprising a machine base, a movable mold carrier and a stationary mold carrier fixedly connected with the machine base and with a supporting element that supports a closing mechanism provided for moving the movable mold carrier. The supporting element is linked flexibly with the stationary mold carrier by at least one force transmitting element adapted to take up forces occuring when the mold is in a closed position. Furthermore, the injection molding machine comprises a motion path along which the movable mold carrier is displaceable.

2. Description of the Prior Art

An injection molding machine of this kind is, for example, known from German Utility Model 92 12 480. In this injection molding machine a supporting element and a mold carrying plate are jointedly and tiltably connected with a machine base of cast iron, which deviates the closing pressure occuring during the closing process and the lifting force occuring between the supporting element and a mold clamping plate during injection. In order to avoid evasive movements of the mold plates, known as "cherry-stone effect" and to obtain parallelism of the mold, guiding devices are provided for the movable mold carrier, to guide it parallely to the other mold part, especially in case of eccentric loads, for example, by off-center mold cavities. The principle followed is to form the machine base so rigidly that it is only minimally deformed under the occuring forces and additionally, to keep away the remaining deformations from the mold by the jointed bearing of the mold carrying plate and the supporting element. However, the manufacture of the cast iron machine base, due to its size, causes difficulties, namely concerning blowhole formation. Since the stationary mold carrying plate is jointedly coupled at the machine base, a nozzle cannot be reproduceably adjusted to zero point, due to the occuring forces during the closing process.

German Published Patent Application 42 30 348 discloses a machine, in which a supporting element and a mold carrying plate are jointedly connected with a machine base of cast iron, which deviates the forces occuring during the closing and the injection process. The movable mold carrier and a supporting element are jointedly connected by a toggle mechanism, at which a driving device is freely suspended at link points of toggle levers, whereby evasive movements of the movable mold carrier are avoided. In this arrangement the machine base is formed according to German Utility Model 92 12 480.

A further injection molding machine of this kind is known from European Post-Published Patent Application 554 068. In this machine a clamping means is provided, that is deformable without essentially deviating stresses originated by the moving- and injecting forces into the machine base. The clamping means, together with the other parts of the mold closing unit, constitute a closed strength framing and can be optimally adjusted to the respective operating conditions. The deformations have little influence on the position of the fixed clamping plate. Peripheral units screwed at the machine base, such as handling- and withdrawal devices, are not influenced by the deformations, so that an exact triggering of the deposit points is reproduceably possible. The horizontal zero point of the nozzle remains at zero, even under maximum locking pressure, since the zero point of the nozzle is fixed by the rigid connection between the unremovable clamping plate and the machine base. The principle followed is to deviate the deformations by a clamping element, which has no influence on further machine parts, whilst the closing forces are unhinderedly summoned up in the closing direction. Due to the decoupled deformations, a safe closing of the injection tools during the whole injection process is guaranteed. The application of guiding rods can be almost completely omitted, whereby it is made possible to realize a better access to the injection tools as well as to achieve shorter retrofit-times. Indeed, the bearing points for the clamping element in this arrangement are arranged directly at the stationary mold carrier and at one supporting element. They slide in eyes of the clamping means. As a result, there are, on the one hand, difficulties with regard to the mold parallelism, and on the other hand, the joints are worn so much in the course of the machine life, that a complete exchange of the mold carrier and the clamping element is inevitable.

From Austrian Patent 372 333, there is furthermore known a machine for processing synthetic materials in that both mold carriers are movably arranged at a C-shaped clamping element. Due to the arrangement of the mold carriers, the deformation forces, occuring when locking the mold, can in fact be deviated by the clamping means, however, it is not possible to reproduceably produce an exact nozzle contact point, since both mold carriers are movably supported, so that this device does not satisfy the requirements made to an injection molding machine for processing synthetic materials.

SUMMARY OF THE INVENTION

It is an object of the invention to provide an injection molding machine for processing synthetic materials, which is of the kind described first hereinbefore, in that the deformations occuring at the mold closing unit are deviated without influencing the machine base, even after a long life and without affecting the mold parallelism.

That object is accomplished in accordance with the invention in that the force transmitting element is formed as a separate clamping means deformable by forces and that the supporting element is movably supported in a closing direction at the machine base, whereat linked elements, used for flexible connection, are detachably connected to the supporting element, to the stationary mold carrier and to the clamping means.

The advantage offered in such an arrangement is not only that the deformations are deviated and taken up outside the principal components of the mold closing unit, thus permitting a form-fit connection between the parts, required when pressure is applied, which guarantees a safe building-up of the mold closing force, but also an easy adjustment and re-adjustment of the mold parallelism by detachably mounted linked elements and of the arrangement of the joints. The arrangement of the joints leads to a reduction of the bending stress of the mold carrier and furthermore permits a smaller dimensioning of the mold carrier and thus contributes to a reduction of the construction height. In case of wear, each link can individually be easily exchanged, without need of exchanging nearly the complete mold closing unit. The detachable fastening of the links furthermore creates the constructional conditions for an easy variability of the mold clamping dimensions. At the same time, the deformations are decoupled from the machine base and the peripheral units. A zero point of the nozzle is invariably fixed. The application of guiding rods can be omitted.

According to a preferred feature, the distance between the stationary mold carrier and the movable mold carrier is alterable by washer pieces, which are insertable between the linked elements and the stationary mold carrier, the supporting element or the clamping means, respectively. Such an arrangement offers the advantage that washer pieces can be provided, in case the mold clamping dimension must be changed, as it is often usual in Asian countries, due to the mold manufacturing style there.

According to a preferred feature, the closing mechanism is a toggle mechanism comprising a joining element flexibly suspended at the movable mold carrier and the supporting element by two holding elements, which are coupled at link points of the toggle mechanism, wherein the joining element supports a driving device. In such an arrangement a toggle mechanism is provided, joints of which at the same time serve as joints for coupling the force transmitting element. The toggle mechanism is a so-called "Y-toggle-lever", making possible an extremely space-saving construction of the mold closing unit, although a manageable space has to be provided for this driving device.

According to a preferred feature, the driving device is a quill drive, having a ball rolling spindle inside, which is at least partially receivable in the quill drive. Such an arrangement offers the advantage that the driving device can be provided with a ball rolling spindle inside without requiring separate space. Thus, an additional gear transmission is not necessary when using a quill drive, so that the space requirement in the machine base, in which the driving unit is located, can be further minimized.

According to a preferred feature, the clamping means supports the supporting element movably at the machine base in the closing direction, wherein second bearing elements are arranged in a neutral area of the clamping means and in a plane lying perpendicularly to the closing direction, the plane being substantially laid through one of the link points of the toggle mechanism. Since in such an arrangement the movable mold carrier and the toggle mechanism are of a shorter construction, the clamping means is also shorter and consequently of less weight. The utilization of the clamping means offers the advantage, that guidings can be provided on "the side sheltered from the wind", so that the guidings extending into the mold tentering space can be arranged in an area, which is all the same only limitedly accessible for a mold because of the clamping means. When a freely deformable clamping element is used, the whole mold closing unit has to be reliably, axially and movably supported at a second point. In case of applying a toggle mechanism it is not absolutely necessary to provide a supporting element, since the jointed connection with the clamping element therefor is sufficient. In order to save on expenditures of time and space required for the supporting plate, the second, axially movable bearing point of the mold closing unit, is arranged in an area of the coupling point of the toggle mechanism, namely on the side opposite to the movable mold carrier. The coupling is preferably effected in a neutral area of the clamping means, without disturbing the operation method of the clamping means itself.

BRIEF DESCRIPTION OF THE DRAWING

FIG. 15a is a representation according to FIG. 15 with a washer piece.

DETAILED DESCRIPTION OF THE PREFERRED EMBODIMENTS

The invention will now be described in more detail by example with reference to the embodiments shown in the Figures. It should be kept in mind that the following described embodiments are only presented by way of example and should not necessarily be construed as limiting the inventive concept to any particular physical configuration.

Figure 16:
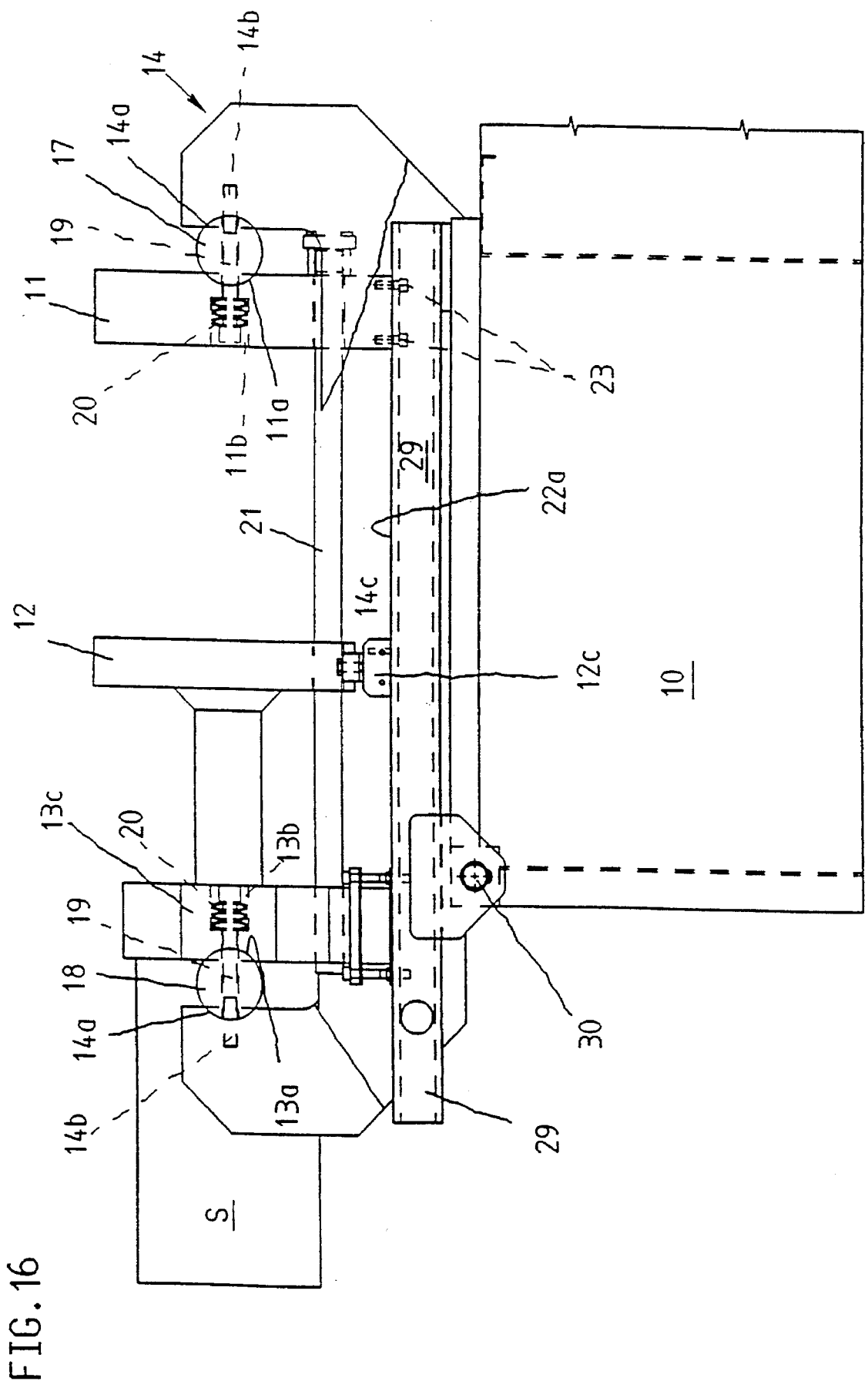
FIG. 16 shows the injection molding unit in a view according to FIG. 1 in a forth embodiment comprising a swivel framing
Figure 17:
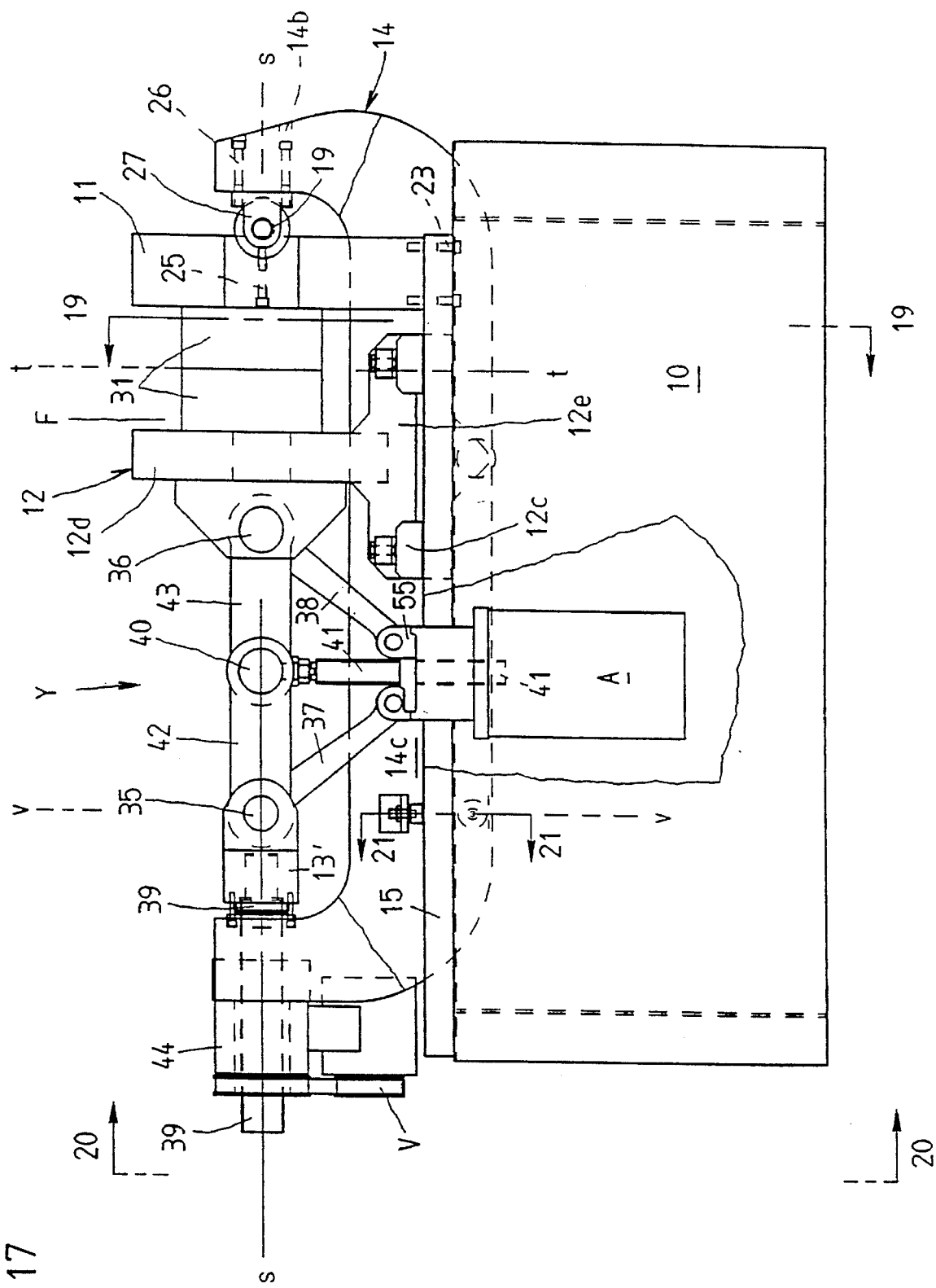
FIG. 17 shows a fifth embodiment of the mold closing unit in a side view comprising a Y-shaped toggle mechanism.

All embodiments have in common that a stationary mold carrier 11 and a movable mold carrier 12 are arranged on a machine base 10 or at least a part of as for example a swivel framing 29 (FIG. 16). A closing mechanism S, arranged at a supporting element 13, is provided for moving the movable mold carrier 12. The supporting element 13 is hinged with the stationary mold carrier by at least one force transmitting element adapted to take up the locking pressure and the injection forces occuring when the mold 31 is in a closed position. The movable mold carrier 11 is displaced along a motion path, preferably on guidings. The space between the movable and the stationary mold carrier constitutes a mold clamping space F for a mold 31 as shown in FIG. 17. Parts of the mold 31 can be clamped on the stationary mold carrier 11 and on the movable mold carrier 12 also.

The force transmitting element not only serves for transmission of the forces, but is also a separate clamping means, deformable by the forces, which in the embodiments is formed as a shackle. The shackle form indeed makes possible an easy access to the mold tentering space, however, other forms can be applied as well. The stationary mold carrier 11 is mounted at the machine base by fixing elements 23, whereas all other parts of the mold closing unit, i.e., the movable mold carrier and the supporting element contrary to the machine base, are movable. From the figures it can be seen that the supporting element is only movably clawed at the guide rail 22 or the guide rod 15 and, relative to the machine base, is displaceable along them in a closing direction. Generated forces have no influence on the machine base, since after deviation of the other deformations, essentially there is only an axial movement in the closing direction, which does not affect the machine base.

Figure 1:
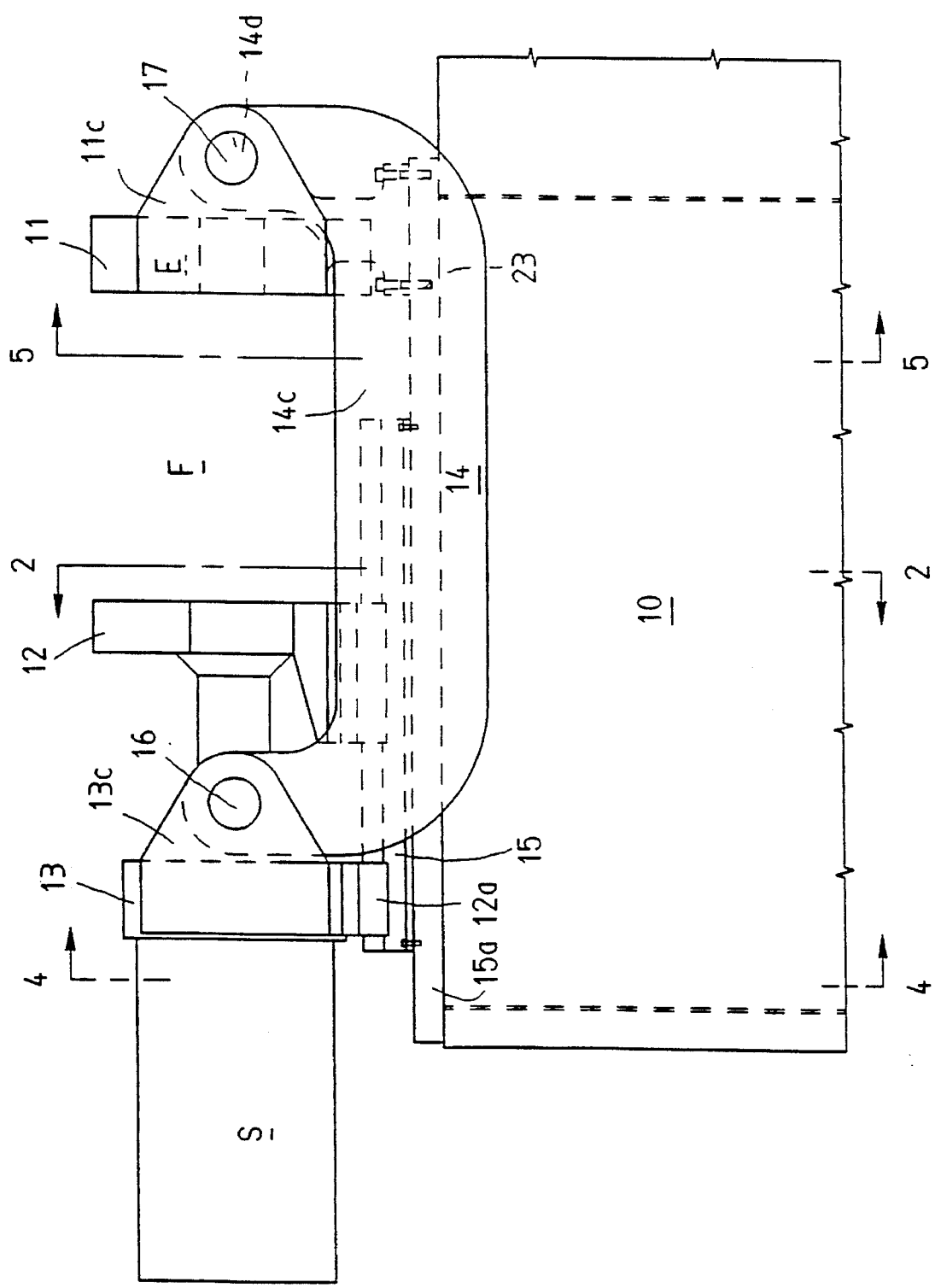
FIG. 1 is a side view of the mold closing unit of the injection molding machine.
Figure 6:
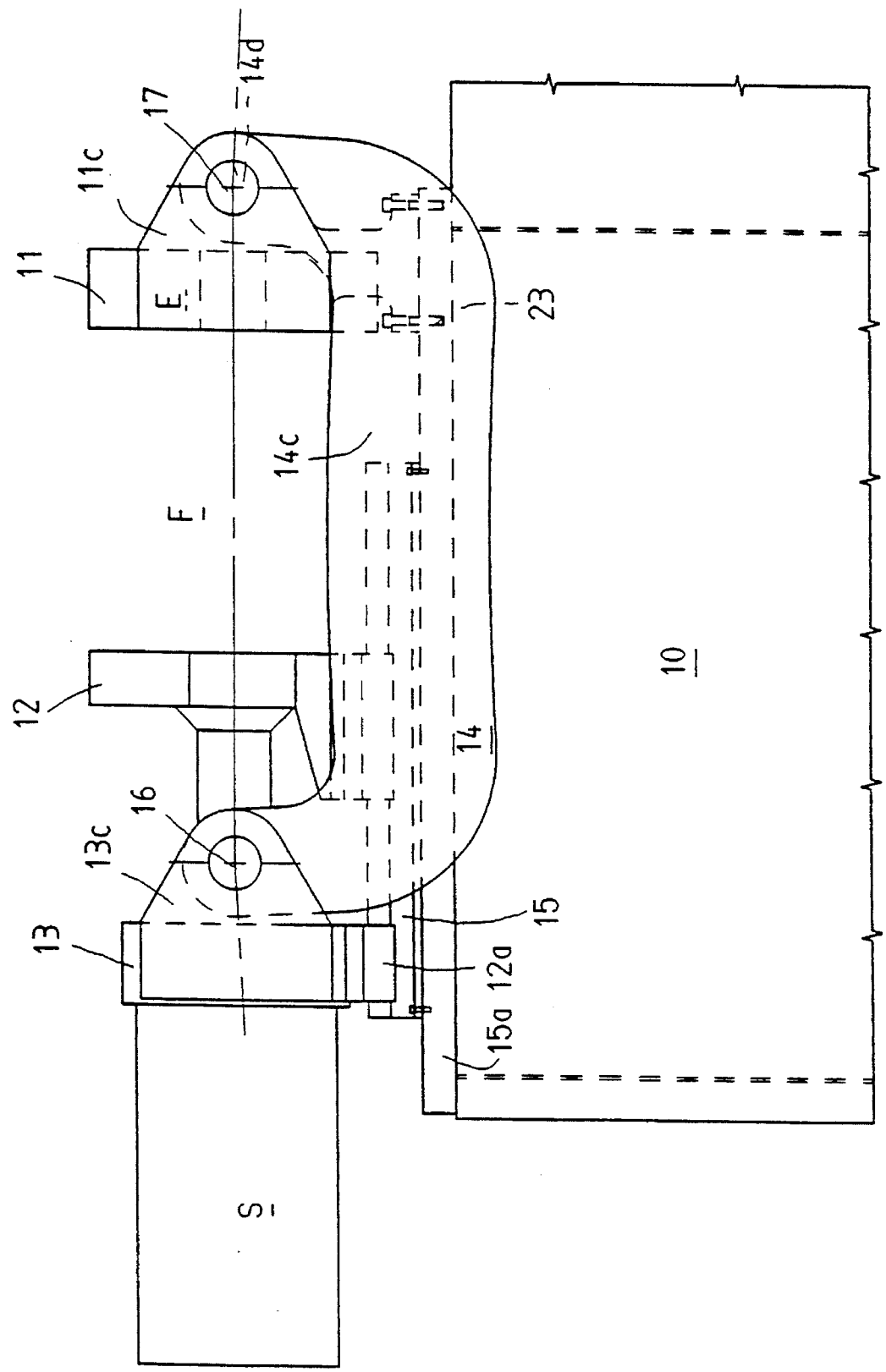
FIG. 6 shows the injection molding unit in the deformation phase in a view according to FIG. 1.
Figure 7:
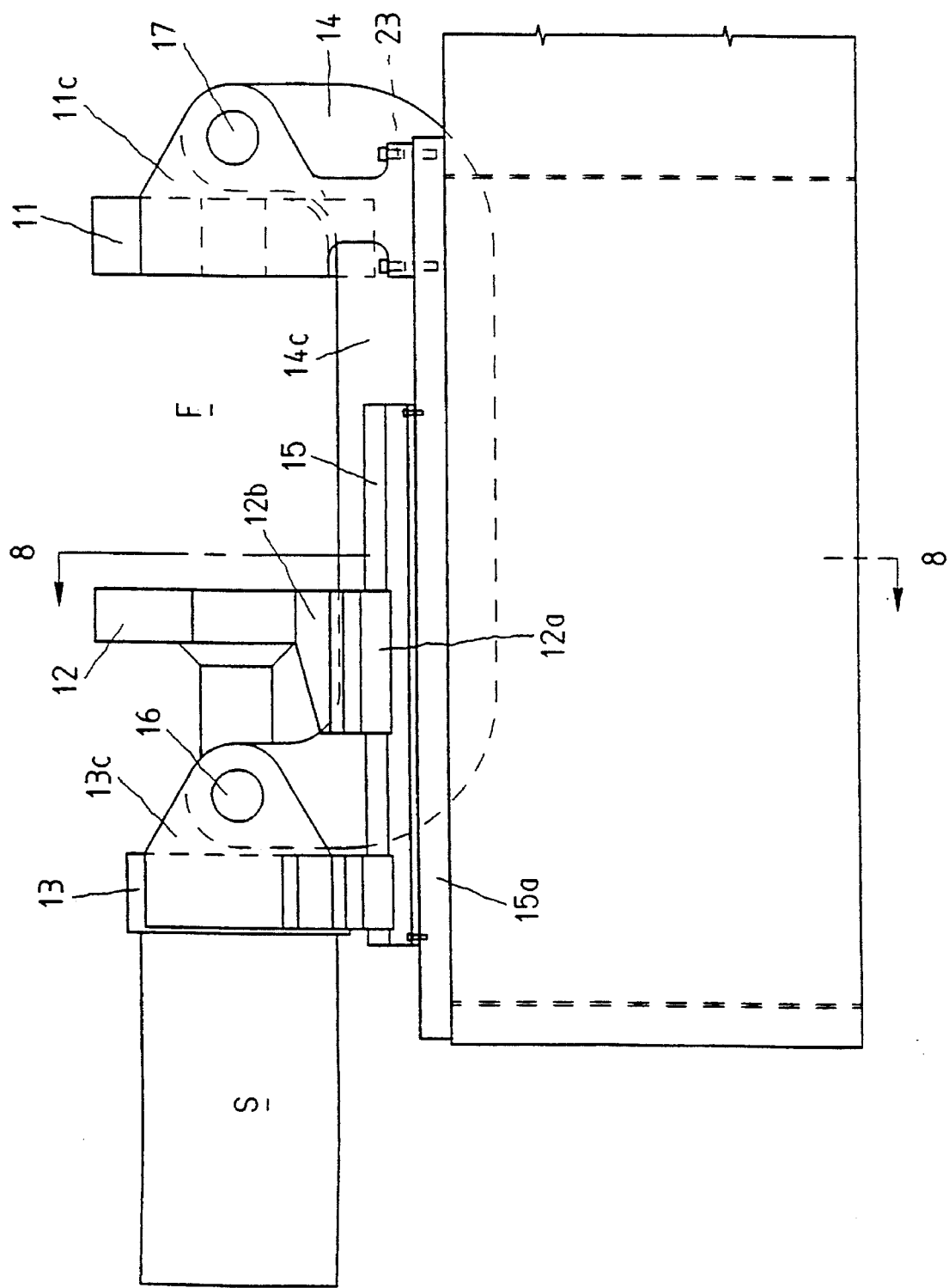
FIGS. 7 and 8 are views according to FIGS. 1 and 2 of a further embodiment of the injection molding unit.

From a comparison between FIGS. 1 and 6 appears that a decoupling of the deformations from the axial forces active in the closing direction is made possible by the clamping means. For that purpose the clamping means is freely suspended and jointedly connected with the supporting element 13 and the stationary mold carrier 11. The clamping means is constituted by two C-shaped shackles 14, whereby the injection opening is kept free. The coupling of the clamping means at the stationary mold carrier and the supporting element 13 is effected by bearing elements.

In the first two embodiments the C-shaped clamping means 14 is coupled at formings 11c, 13c of the stationary mold carrier and the supporting element 13, respectively. The stud 17, which penetrates an eye 14d of the clamping means 14, is supported in a recess of the forming 11c. On the other side the clamping means 14 is connected with the forming 13c of the cylinder plate, which is a supporting element, by studs 16, the coupling point lying between the cylinder plate and the movable mold carrier 12.

Figure 15:
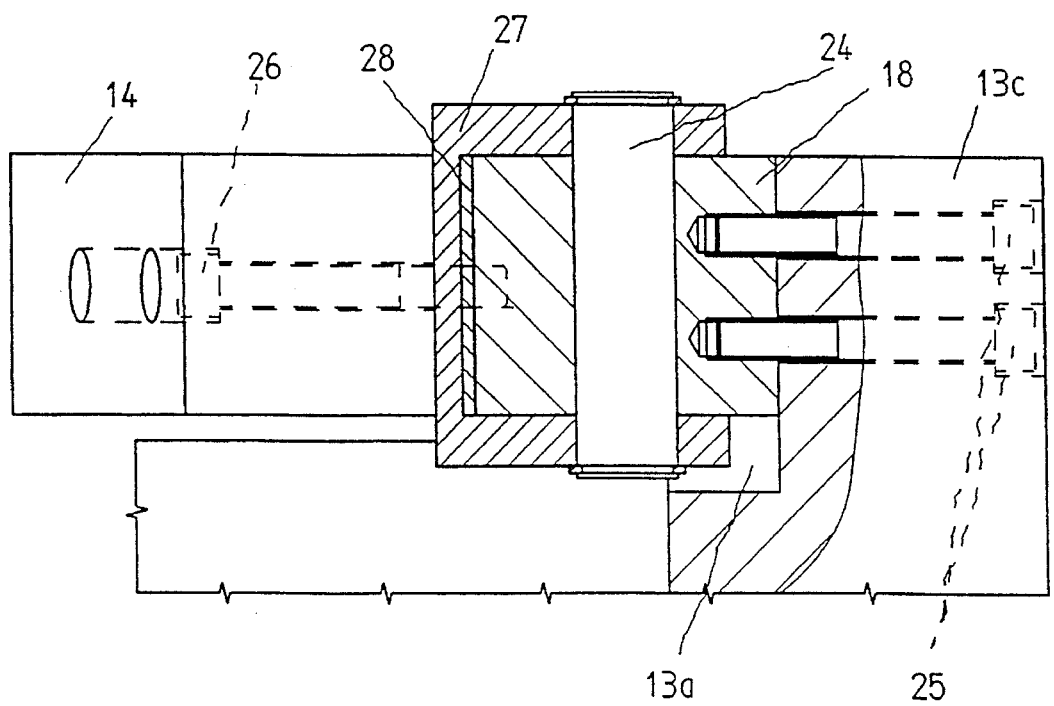

In the third embodiment, shown in the FIGS. 9–15a, studs 17 and 18, forming part of a bearing are provided, which are fixed at the stationary mold carrier 11 or at the supporting element 13 by screws, as can be seen in FIGS. 15 and 16. By a slide bearing 28 the studs are in connection with a pillow block 27, which is fixed at the clamping means 14 by screws 26. A tie bolt 24 projects through stud 18, and attaches the pillow block 27 with the stud 18. This arrangement permits a moment free force transmission.

In the forth embodiment the studs 17 and 18 are arranged in a way that they are received form-fit between the stationary mold carrier 11 and the clamping means 14, and the supporting element 13 and the clamping means 14, respectively, when the mold is closed. The coupling point in the area of the supporting element 13 is arranged on that side of the supporting element, which is turned away from the movable mold carrier 12. FIG. 16 reveals that the studs 17,18 are supported in recesses 11a, 13a, 14a of the clamping means 14, the stationary mold carrier 11 and the supporting element 13. They are penetrated by further bearing studs 19 perpendicularly to their axis, which immerge into bore holes 11b, 13b, 14b of the clamping means 14, the stationary mold carrier 11 or the supporting element 13.

During the mold closure, the bearing studs 19 get into the bore holes 11b, 13b of the stationary mold carrier 11 and the supporting element 13 against the force of the springs 20. This arrangement helps to overcome the ejection forces, however, it also leads to friction forces, which make decoupling of the deformations difficult. The various possibilities to arrange the clamping means create the conditions, up to now not achieved by prior art, for an adaptation of the device to the respective customer requirements, for example with regard to different installation dimensions of the molds, when the clamping element is coupled in front or behind the supporting element. The joint parts, namely the studs 16, 17, 18 and the pillow block 27 of the joints are detachably fixed at the jointedly interconnected parts of the closing unit by screws. If necessary, it is possible to alter the installation dimensions of the mold by using longer screws 25' together with washer pieces 75, which are insertable between the joint parts and the adjacent components, as shown in FIG. 15a.

Figure 2:
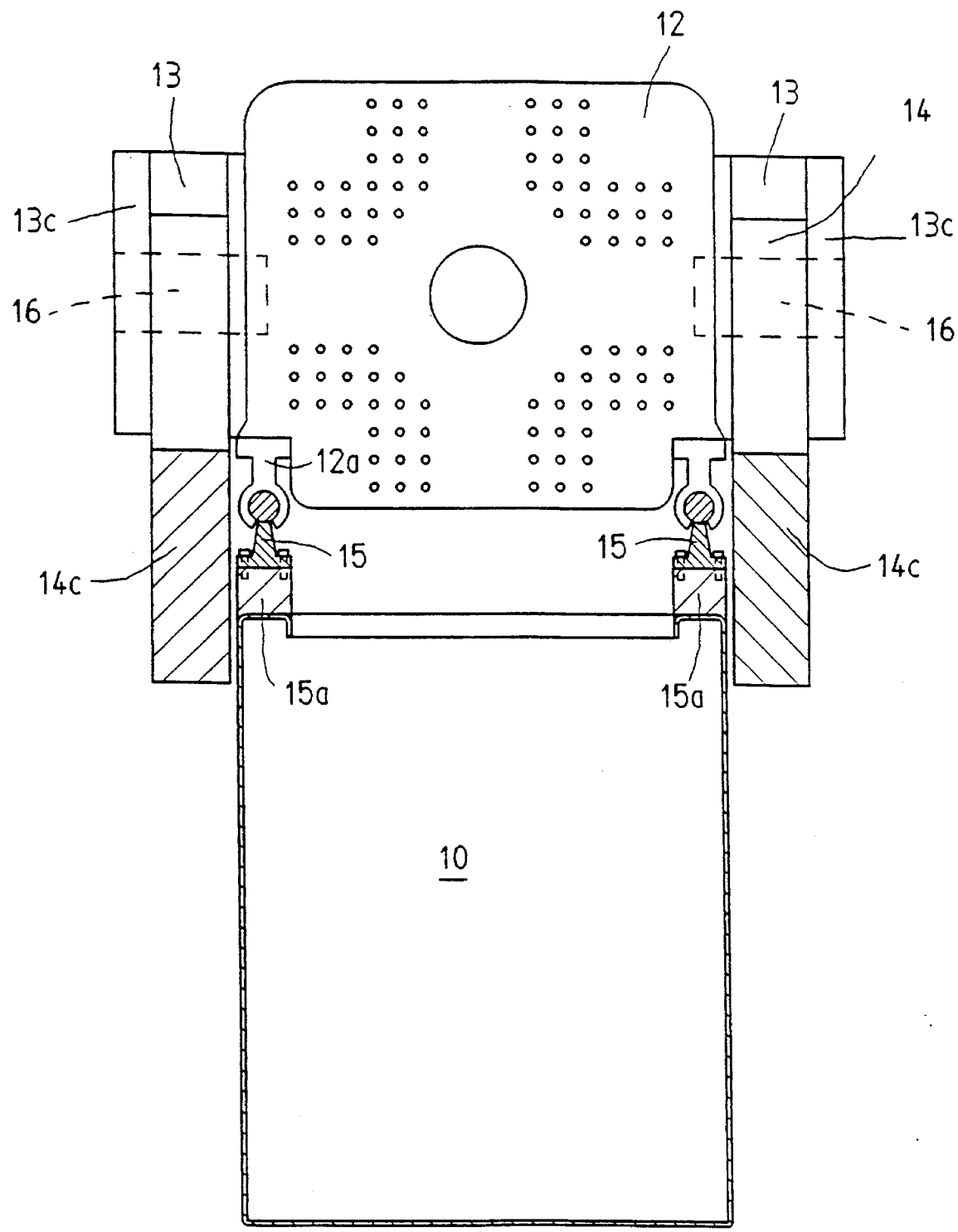
FIG. 2 is a sectional view according to line 2—2 of FIG. 1.
Figure 3:
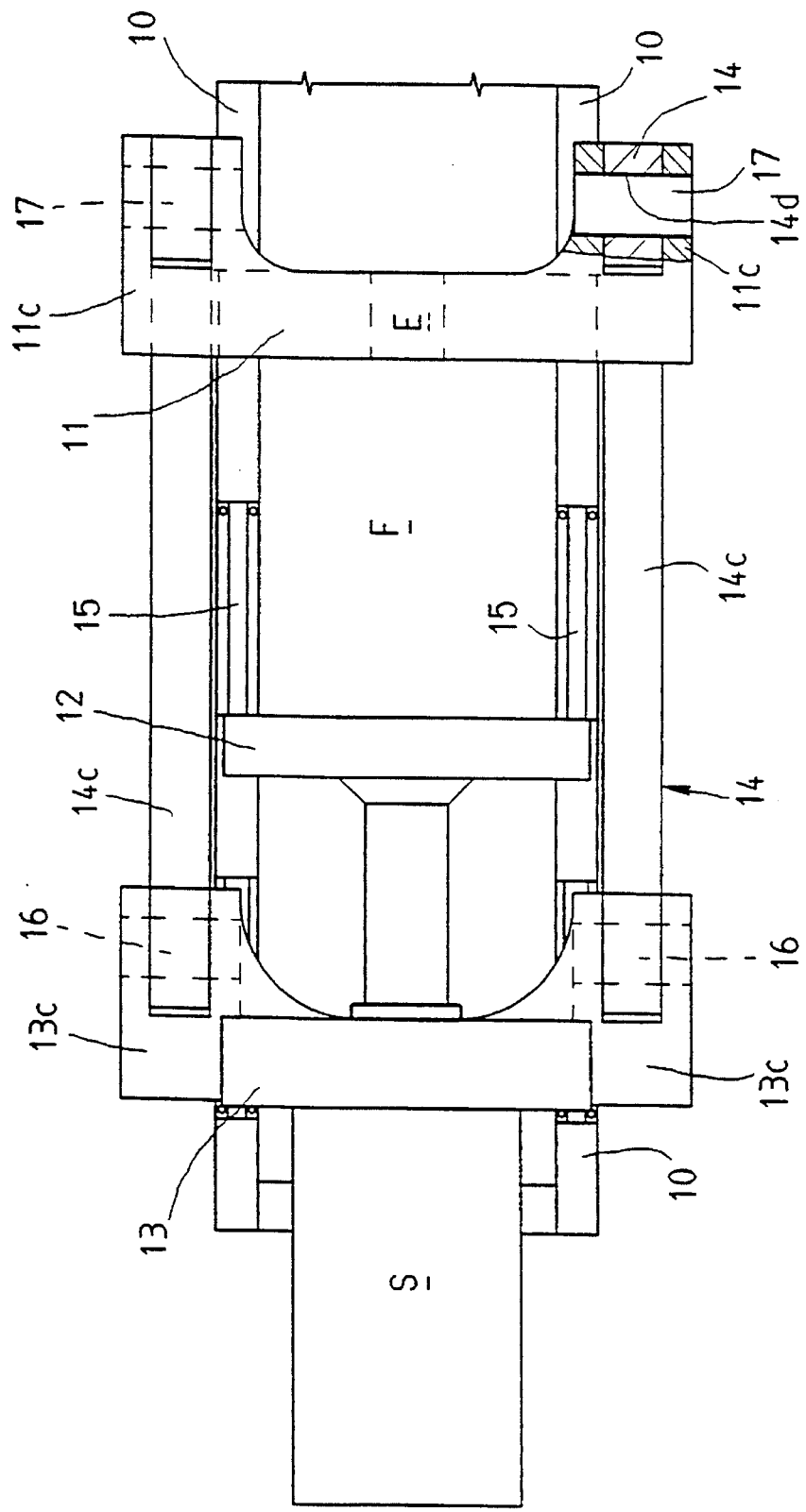
FIG. 3 is a top view of the mold closing unit according to FIG. 1.
Figure 4:
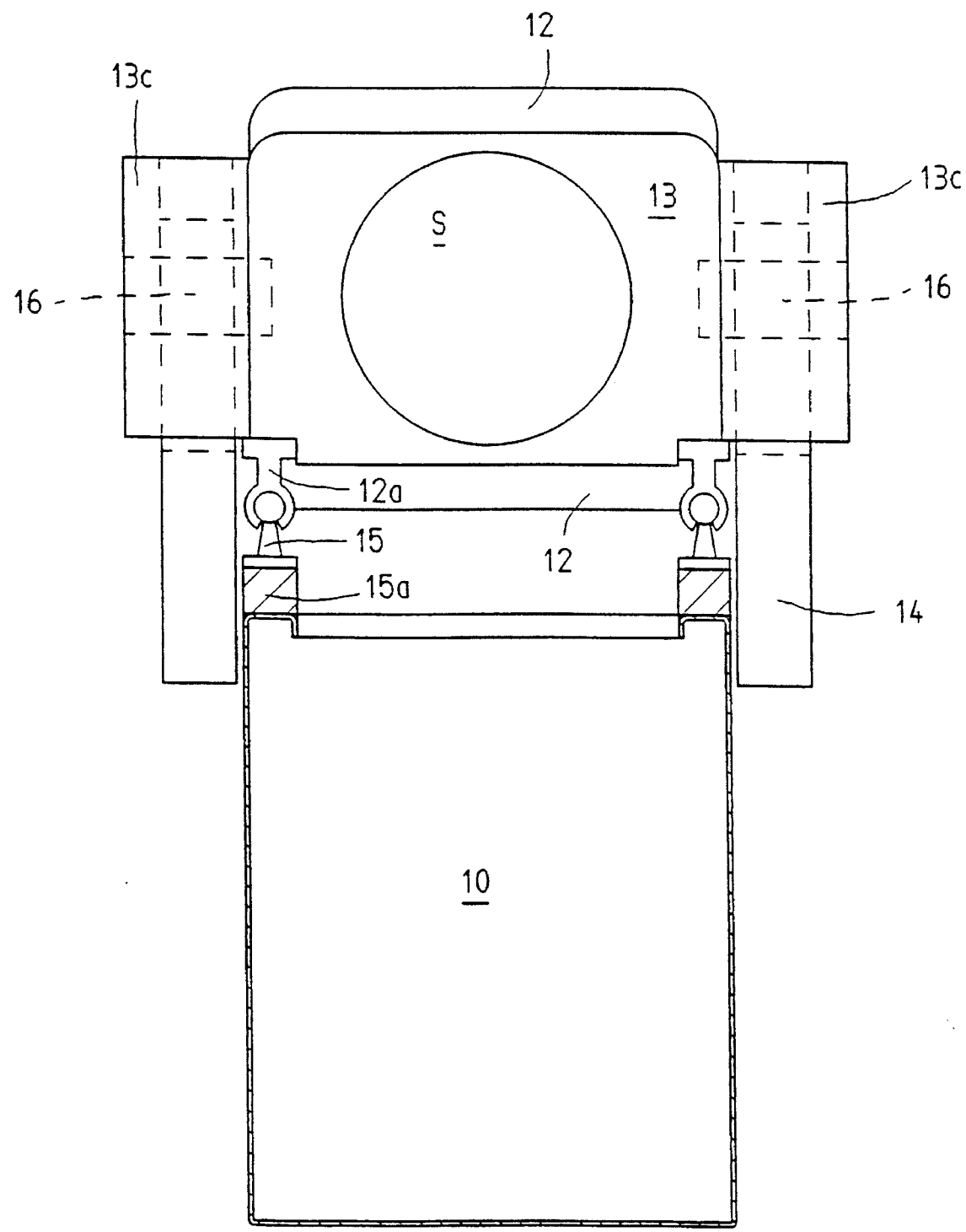
FIGS. 4 and 5 are sectional views according to the lines 4—4, 5—5 of FIG. 1.
Figure 5:
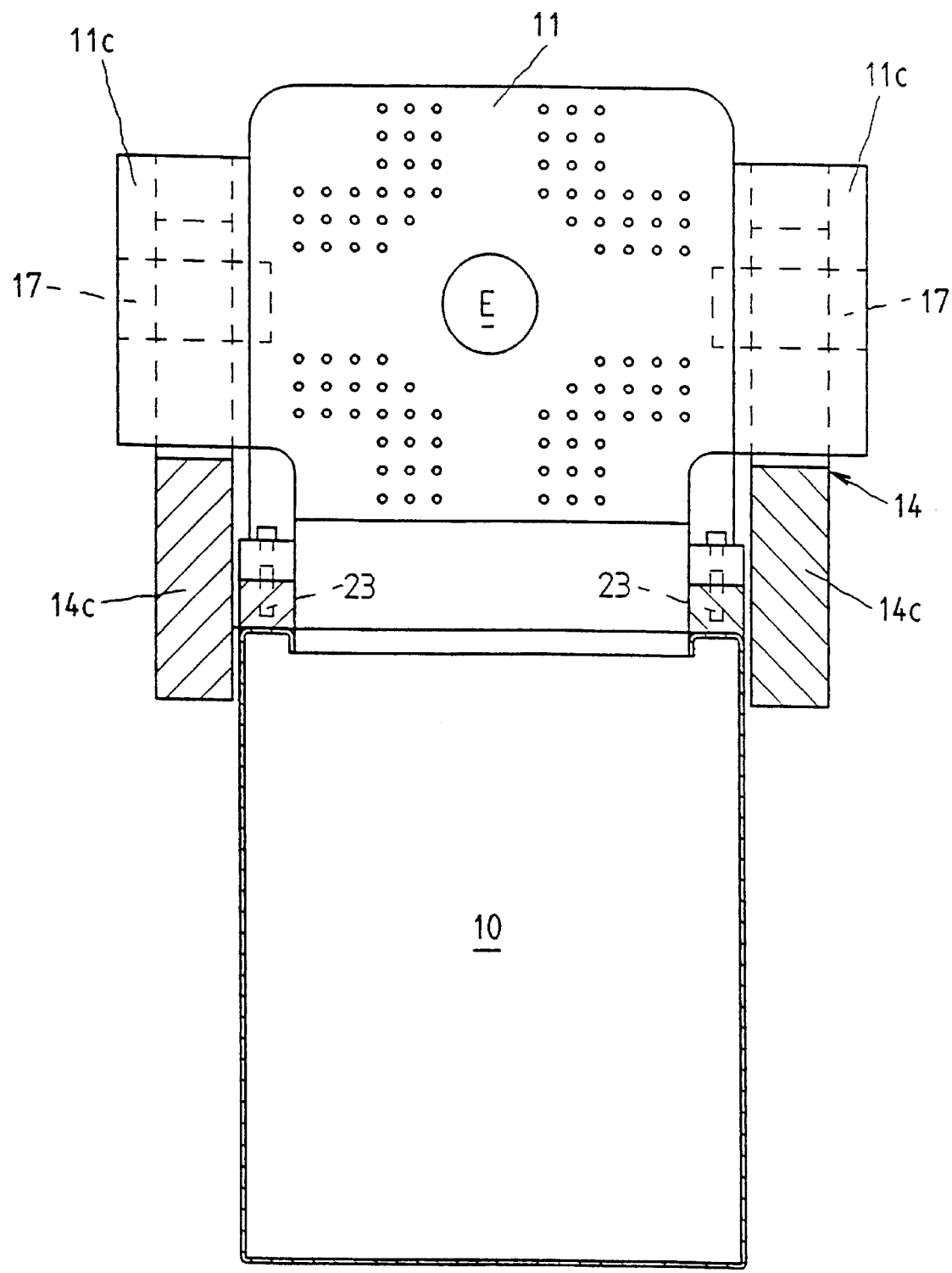
Figure 8:
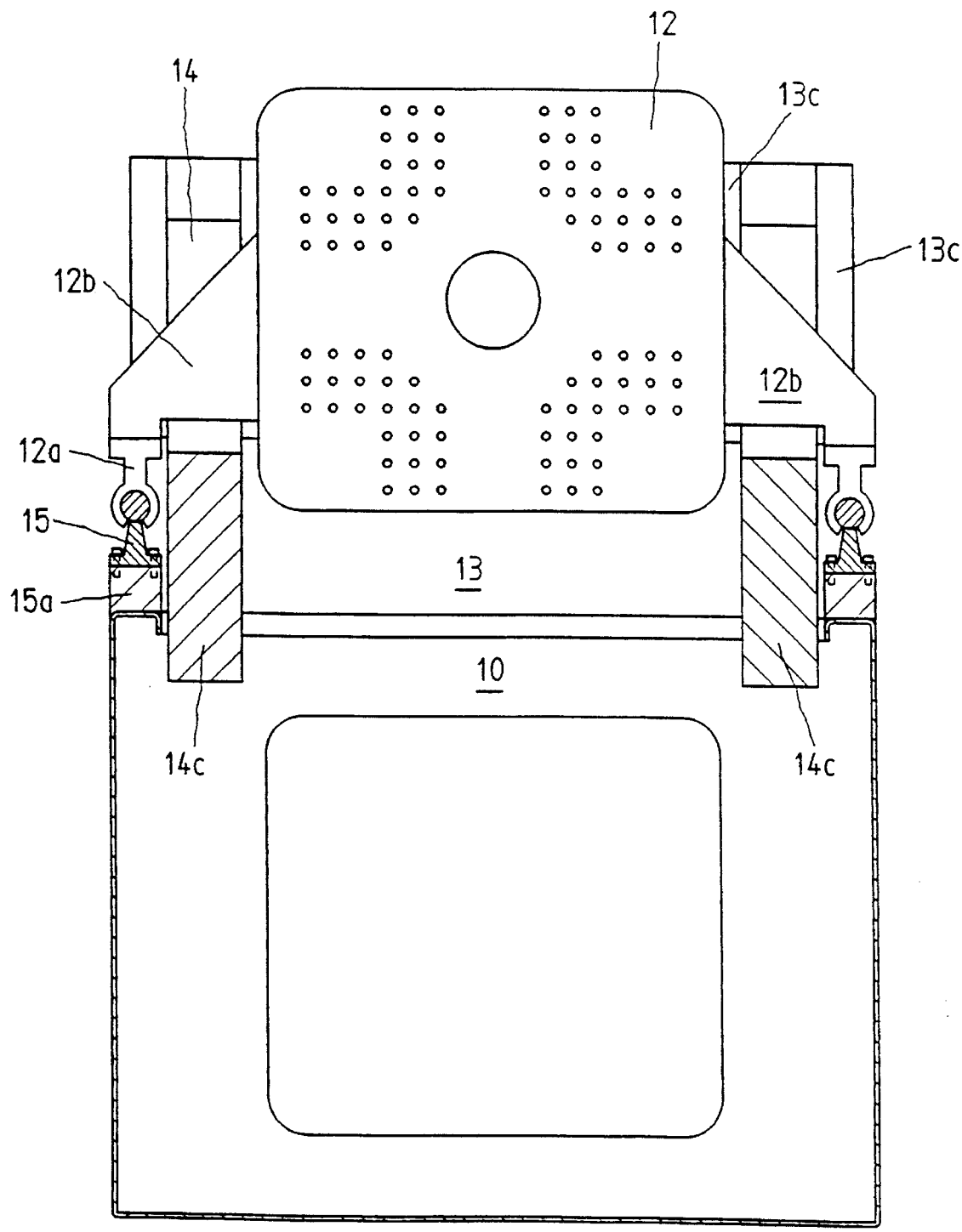
Figure 9:
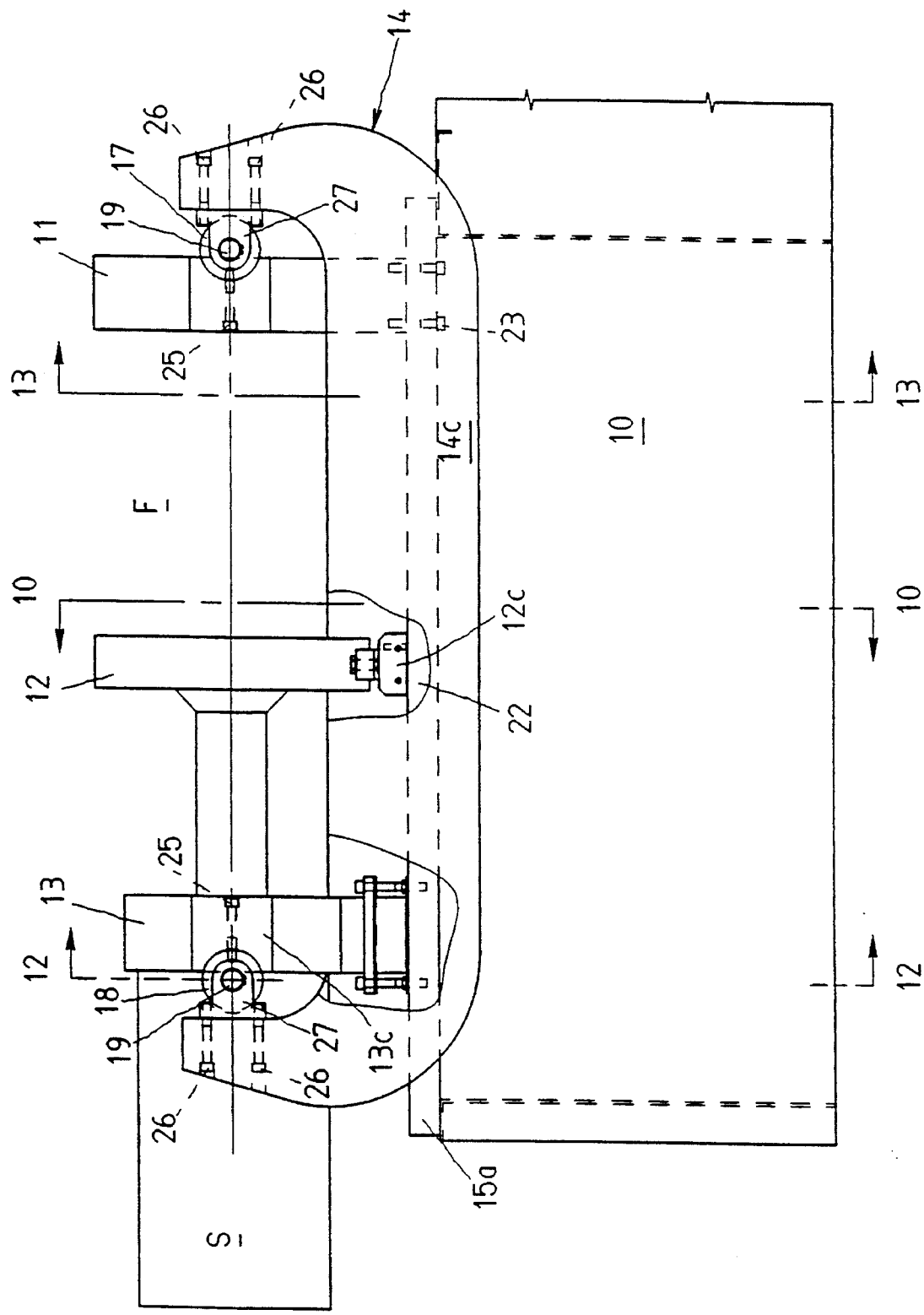
FIGS. 9–13 are views, according to FIGS. 1–5, of a third embodiment with a modified clamping means.
Figure 10:
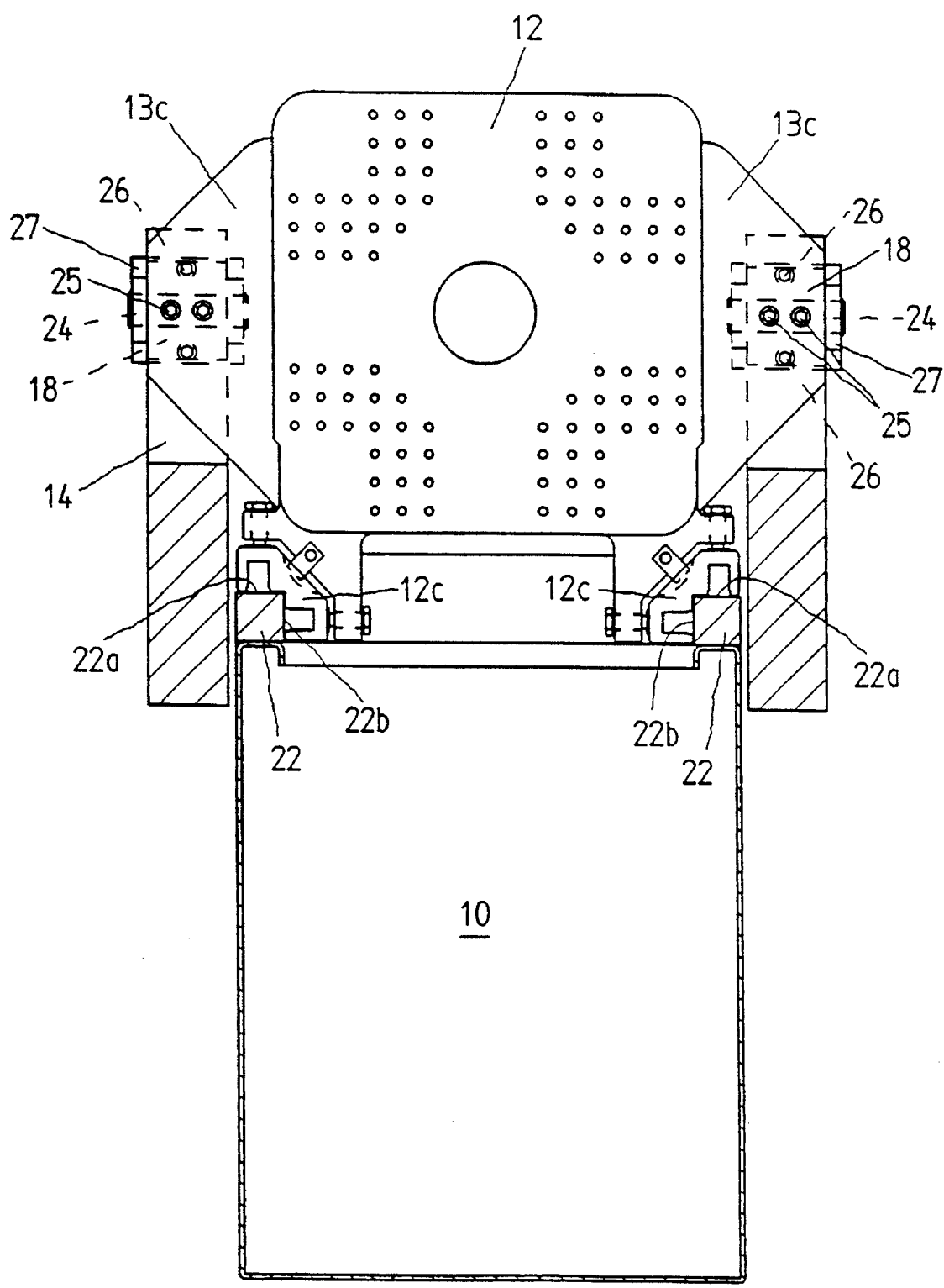
Figure 11:
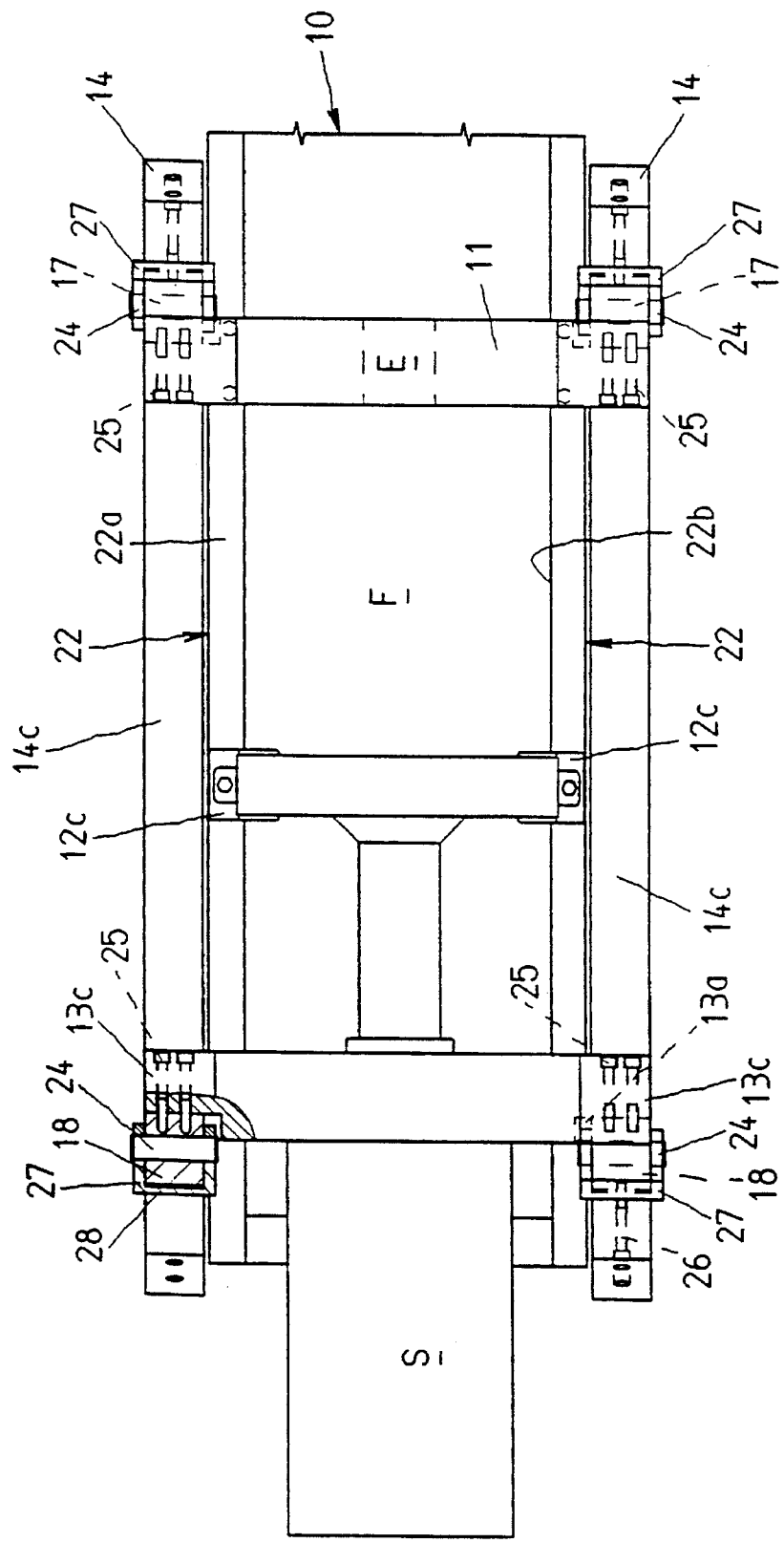
Figure 12:
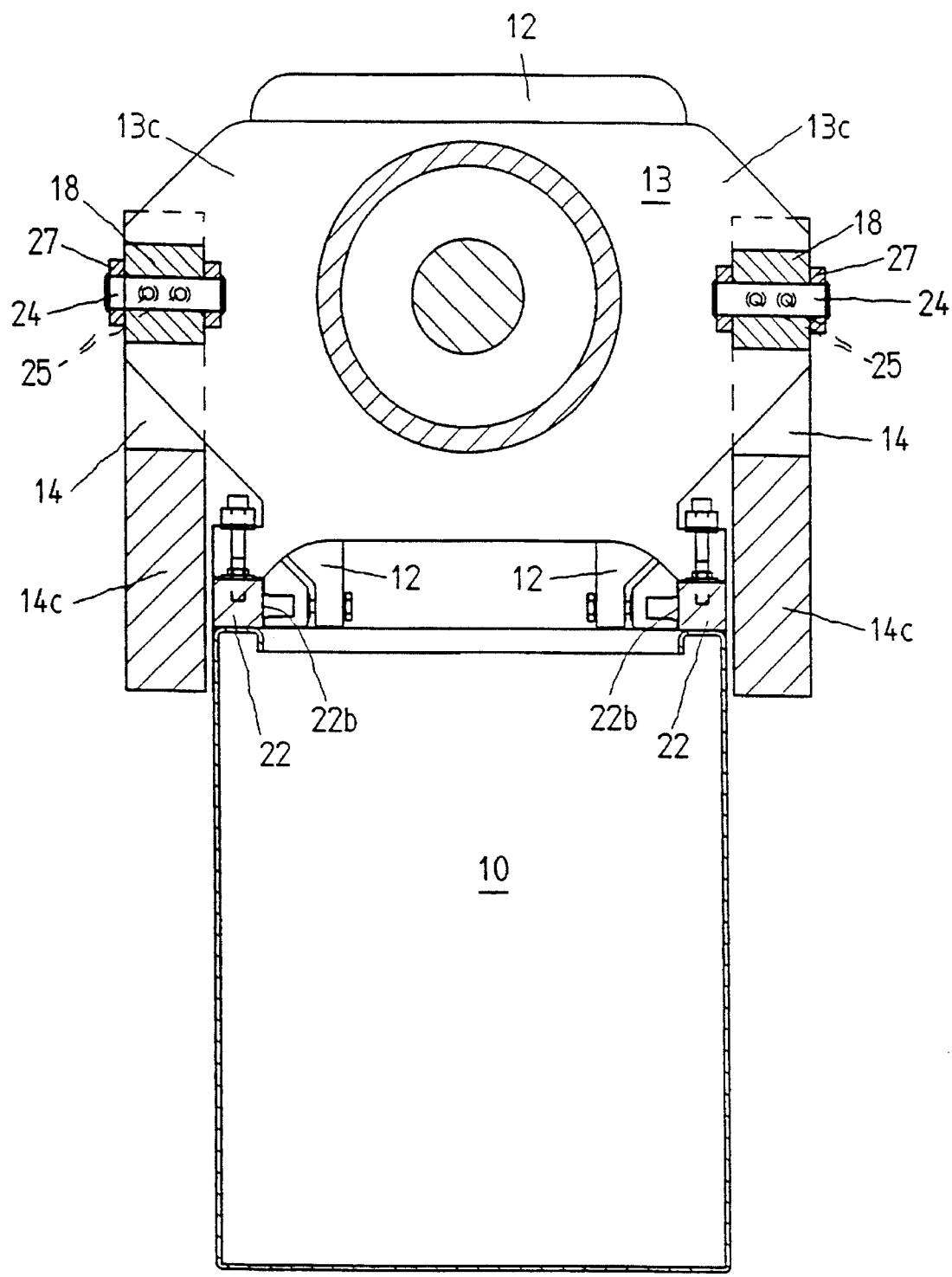
Figure 13:
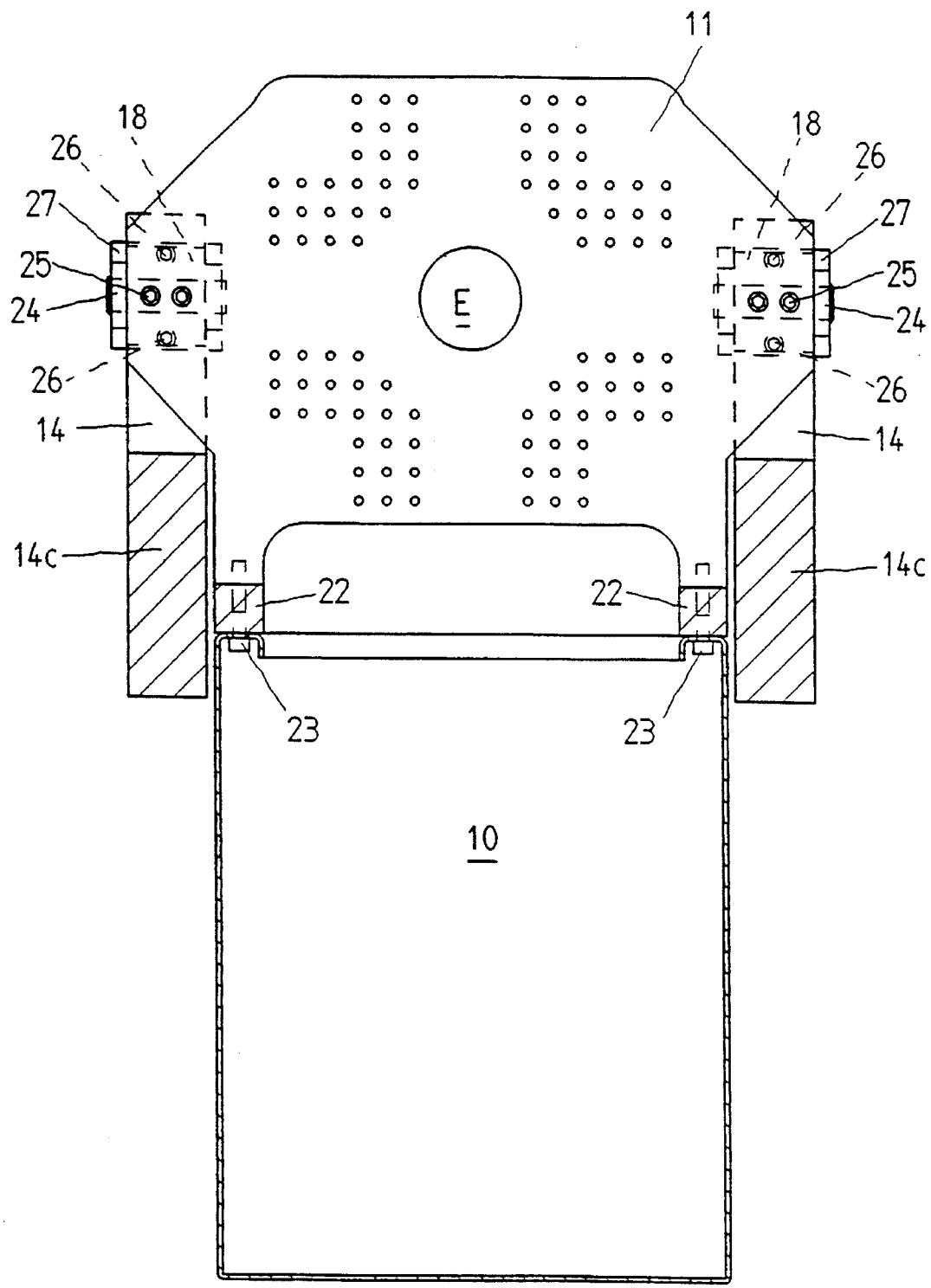
Figure 14:
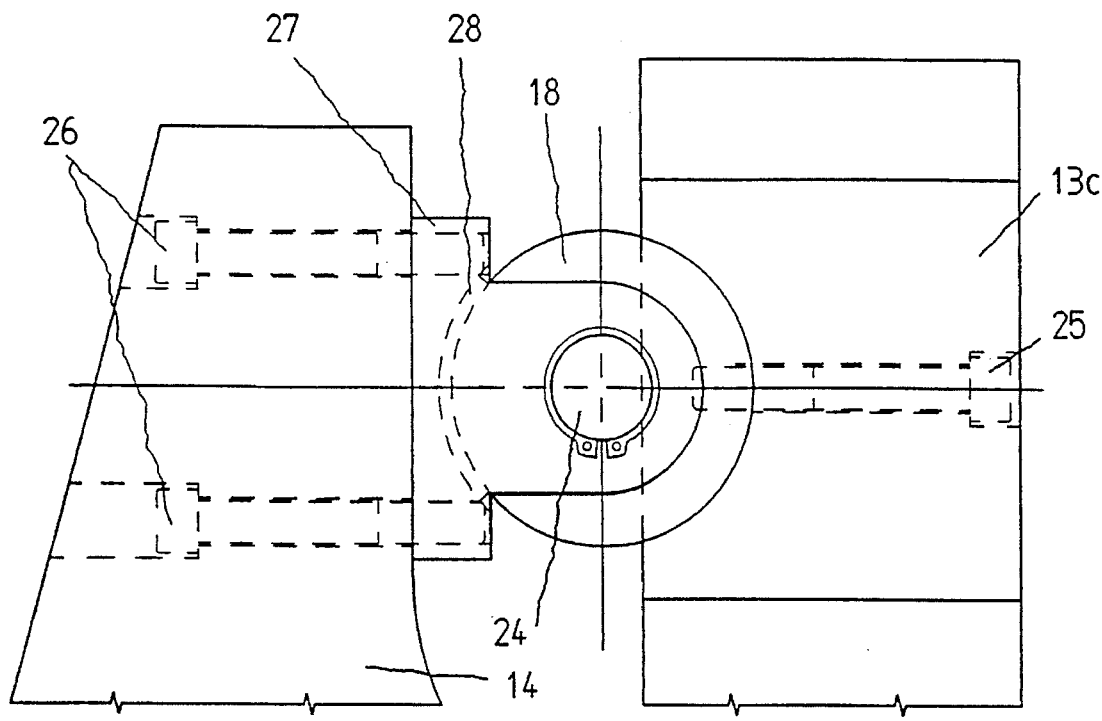
FIGS. 14 and 15 are side views and partially sectional top view of the jointed bearing of the third embodiment.

Whereas in the first embodiment the clamping means 14 is arranged outside the machine base 10 (FIG. 2) and consequently the machine base is of a relatively narrow construction, in the second embodiment the clamping means 14 is arranged within the machine base and also within the guide rod 15. In order to guide the movable mold carrier on the guide rods, the movable mold carrier 12 is provided with formings 12b, which lap over the clamping means in order to move the movable mold carrier on the machine base 10. A comparison between the FIGS. 2 and 8 makes clear; that a broader machine base is required when the clamping means is arranged inside it. The advantage of such a broader machine base is that it offers better possibilities for accomodation of further machine components. The clamping means 14 can also be arranged above the injection axis s-s, thus occluding the injection molding unit at its top. This makes it clear that the mold closing unit is independant from the arrangement of the clamping means, which offers the possibility to use it for a variety of applications. The mold closing unit can be transferred around a swivel pin 30 together with a swivel framing 29 into a vertical position (FIG. 16) without problems. Differing from the embodiments it is also possible to arrange various clamping means at the same time inside, outside and/or at the machine base in order to transmit higher forces.

In order to guarantee parallelism of the mold, the movable mold carrier is conducted on guiding devices of the motion path at the machine base 10. In the first two embodiments the guiding devices are two guide rods 15, which are arranged at the support 15a. The movable mold carrier 12 displaceable along these guide rods is secured against lift-off by means of sliding blocks 12a. According to the fourth embodiment (FIG. 16), motion rods 21 are provided in addition to the clamping means 14, these being supported at the stationary mold carrier 11 and the supporting element 13. They are placed in a space that is locked on both sides by the clamping means 14, so that they do not constitute an additional obstacle in the mold tentering space F. Thus they are placed in an area, which is determined by the vertical dimension of the leg 14c of the clamping means. The actual support of the movable mold carrier is effected by support elements 12c, which are guided along a horizontal 22a and s vertical running surface 22b of a rail 22 at the machine base 10. In the third embodiment the use of motion rods 21 is refrained from.

In the fifth embodiment, shown in the FIGS. 17–24, a toggle mechanism provided as the closing mechanism engages with the link point 36 in the movable mold carrier 12, and with the link point 35 in the supporting element 13'. It transfers the movable mold carrier in and out of a closed position. The toggle mechanism is formed as a "Y-shaped toggle lever", that means that its driving unit A, arranged transversely with regard to the closing direction s-s, is carried freely movable by the toggle mechanism Y by two holding elements 37, 38. An electromechanical linear drive is used as the driving unit, which converts a rotational movement into a straight movement. The toggle mechanism Y is provided with two levers 42, 43, which are connected together by a joint point 40. A linear element of the linear drive engages in this joint point 40.

Figure 22:
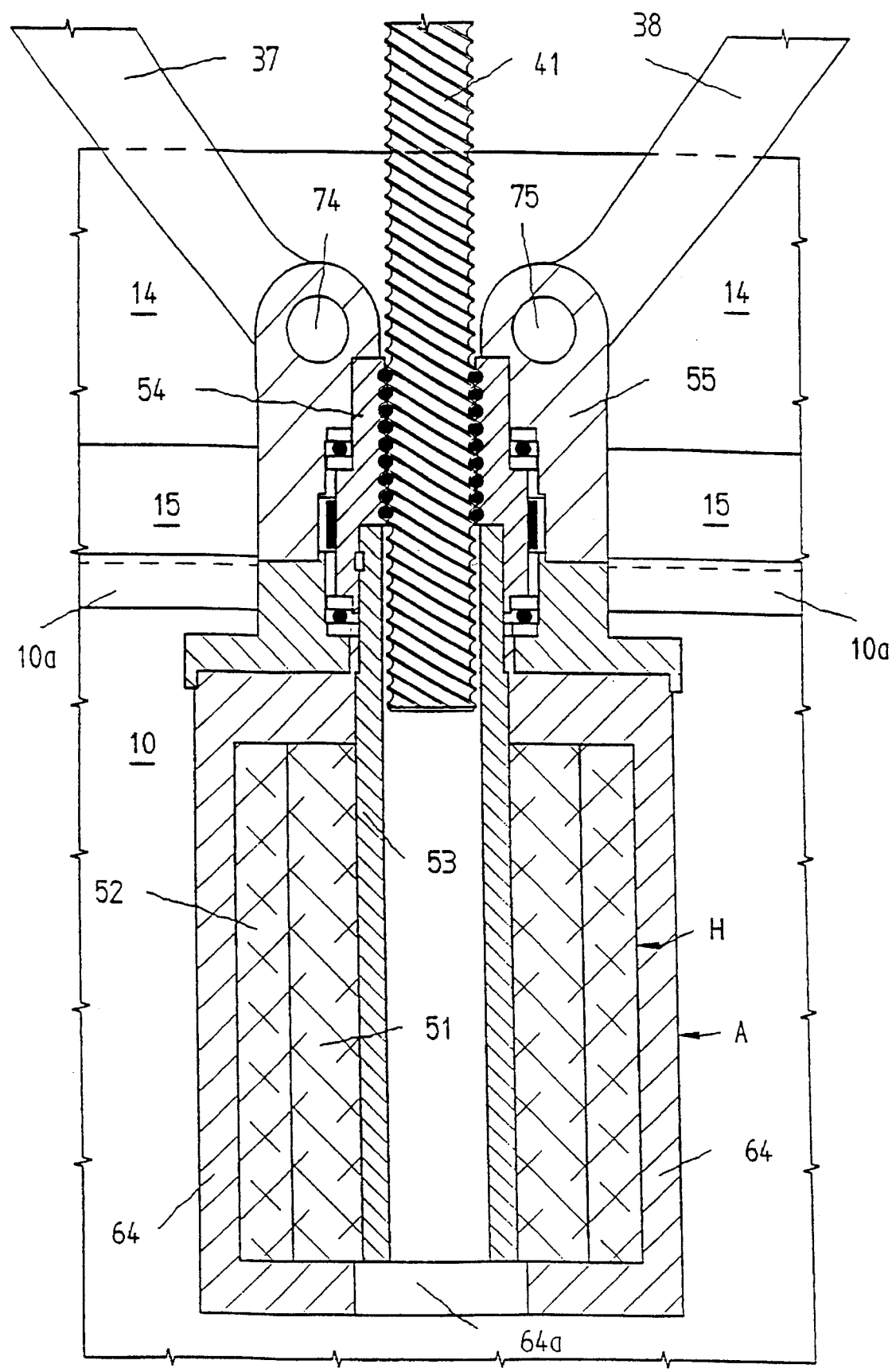
FIG. 22 is an enlarged sectional detail view of FIG. 17 in the area of the quill drive.

It is possible to provide, for example, a ball rolling spindle as the linear drive, but a double toothed rack might be used as well. The ball rolling spindle can be arranged in a quill drive H, which at the same time is the driving device A (FIG. 22). The quill drive has a rotor 51 and a stator 52 located in a housing 64. The rotor is in connection with a sleeve 53. The sleeve 53 coaxially bears a thread nut 54, which cooperates with the ball rolling spindle 41. As a result of the rotation of the thread nut, the ball rolling spindle 41 moves into or out of the sleeve during the closure of the mold. If necessary, it can get out from the driving device at its bottom by an orifice 64a of the housing. The holding elements 37,38, which support the driving device, are connected with a joining element 55 at link points, whereat this joining element supports the actual driving device. The toggle mechanism is vertically movable and unlockable downwards.

Figure 18:
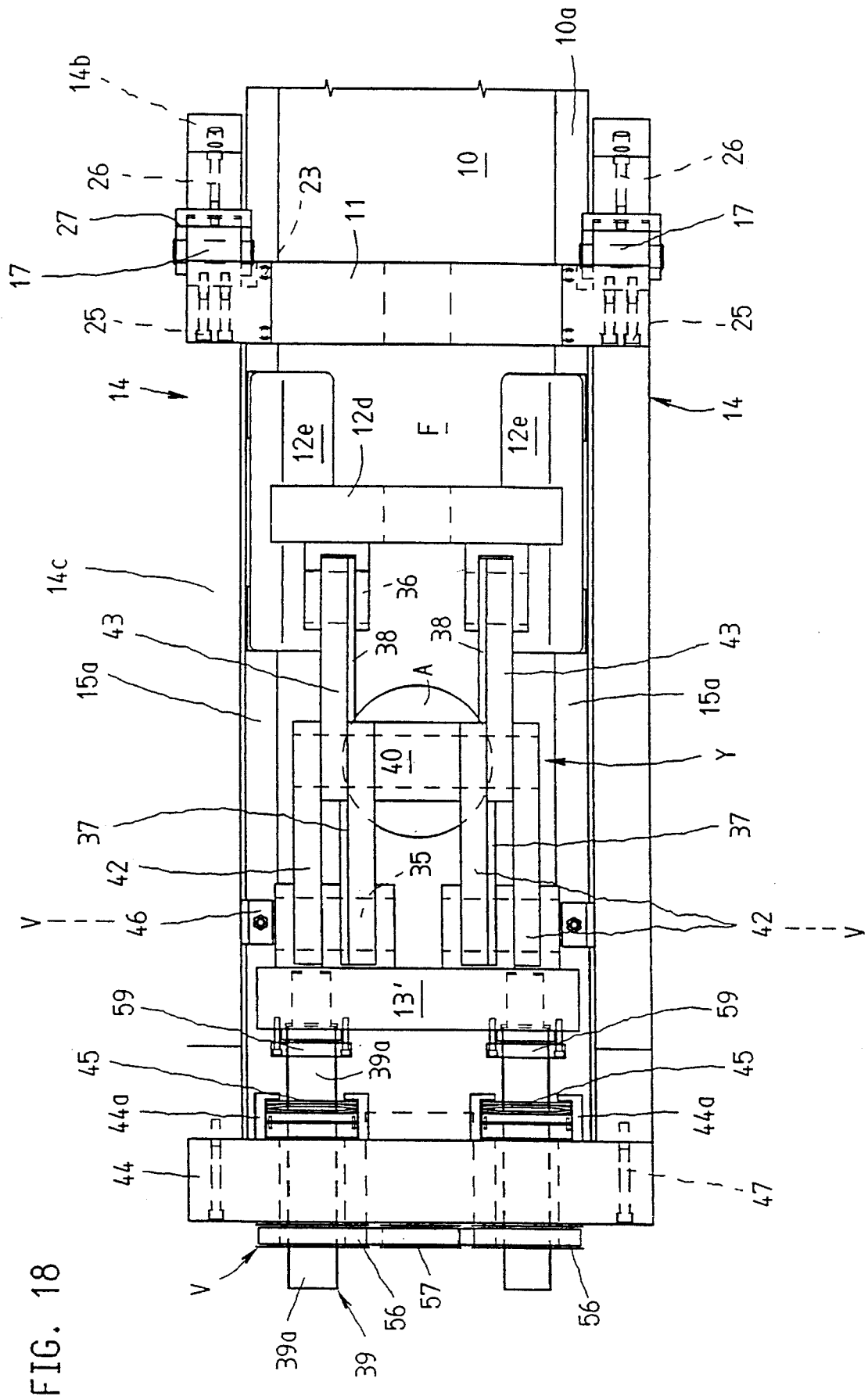
FIG. 18 is a top view of the mold closing unit according to FIG. 17.
Figure 19:
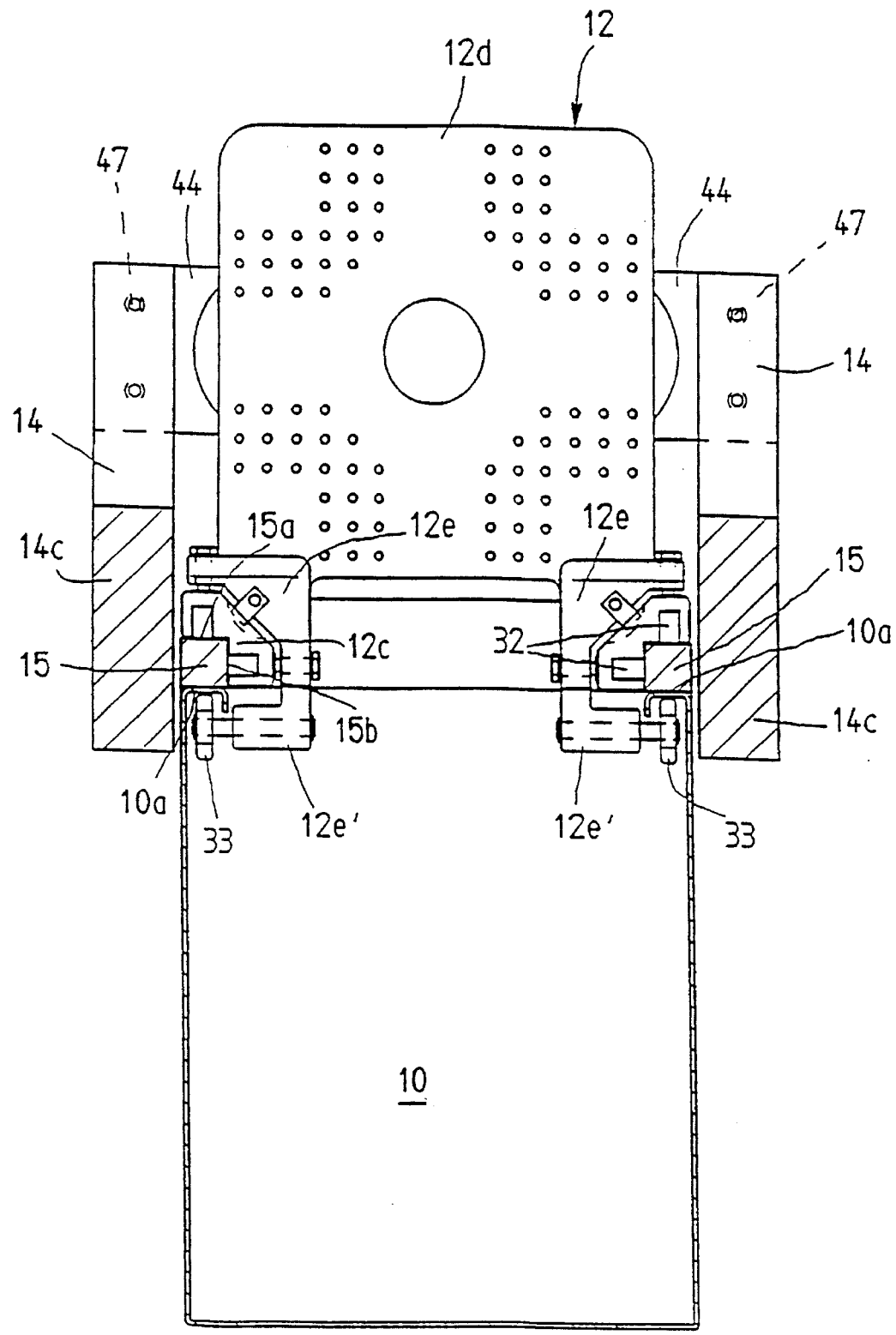
FIG. 19 is a sectional view through the mold closing unit according to line 19—19 of FIG. 17.

The movable mold carrier 12 has to be reliably guided together with the toggle mechanism, which is only coupled. Therefore it is provided with a flat, plate-shaped part 12d standing in a vertical position and with two supporting parts 12e. The parts 12d, 12e of the movable mold carrier 12 might be cut from one piece or be jointly connected. The supporting parts 12e extend into an area outside the mold tentering space F, as well as into a direction towards the stationary mold carrier 11. That way the support surface and the surface for taking up the overturning moments are enlarged. The function of a pressure well arranged in an area of the parting plane is not affected, since the support is effected in a brink area, which anyhow is already partially stressed by the upper border 10a of the machine base (FIG. 18).

The supporting parts 12e catch behind the guidings on the side opposite to the mold tentering space F and are led at the guidings by a central angle of at least 180°. According to FIG. 19 in both supporting parts 12e running elements, which are preferrably roller cassettes 32, are built-in and are led in a known manner at horizontal and vertical running surfaces 15b of a guiding device, which is a guide rod 15, at the machine base 10. It is also conceivable to provide only one horizontal and two vertical roller cassettes. The supporting part 12e engages with one arm 12e' in the machine base under the guide rod. At the arm, a back handle element 33 is arranged, which sits close from the bottom on a flanged border 10a of the machine base 10. Instead, it is also possible that built-in ball bearings 34 surround the guiding devices, which are motion rods 51. In both cases the wrap-around additionally takes up occuring forces, which try to lift off the movable mold carrier from the machine base.

The jointed arrangement of the "Y-shaped toggle lever" can be advantageously be connected with the clamping means. To this the stationary mold carrier 11 is movably connected with the supporting element 13' by at least one clamping means 14. In the "side sheltered from the wind" of a leg 14c of the clamping means 14, guiding devices for the supporting parts 12e and, for example, the bedding of the roller cassettes 32 in the supporting elements 12c can be provided, without requiring separate space.

Figure 21:
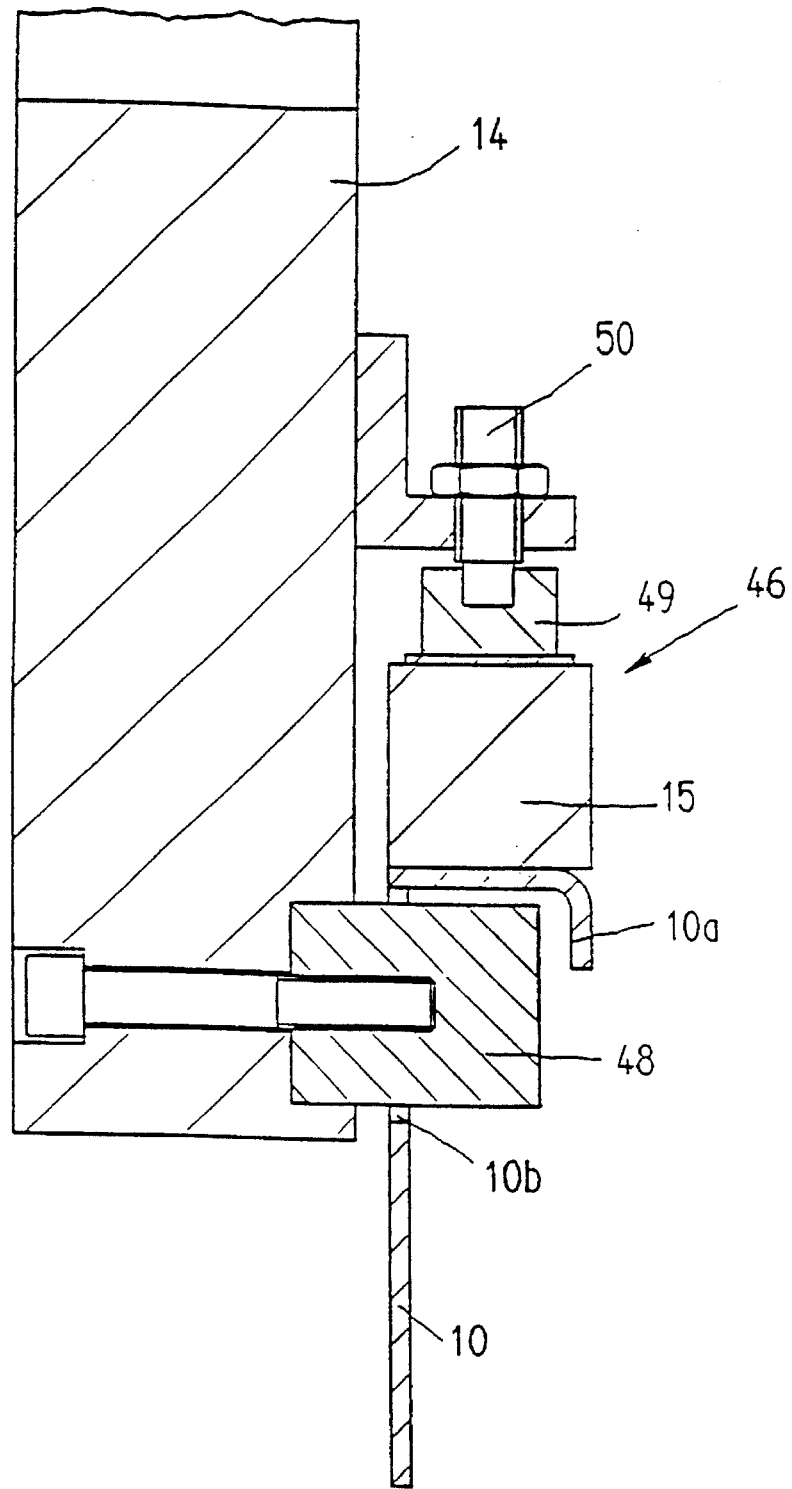
FIG. 21 is an enlarged detailed view according to line 21—21 of FIG. 17 in the area of the bearing.

The supporting element 13' is in connection with the clamping means 14 and the clamping means for its part can be supported according to FIG. 21. The second bearing element 46 is thereby fixed by an angle in a neutral area of the clamping means 14. The precise adjustment can be realized by the adjusting element 50, which is supported on a sliding element 49. The sliding element 49 assumes the actual bedding on the guide rod 15. In order to avoid that the mold closing unit is lifted-off from the machine base when it is lifted, a further element 48 is axially and movably supported in a recess 10b of the machine base. Basically, this element does not touch the machine base. Only if it is attempted to lift the mold closing unit, a connection between mold closing unit and machine base is established. The bearing elements 46, according to FIG. 17, are arranged in a plane v-v substantially passing through the link point 35 and lying perpendicularly to the closing direction. This position has been chosen, since this point is the joint point for the clamping means, so that here the lowest deformations are produced.

Figure 20:
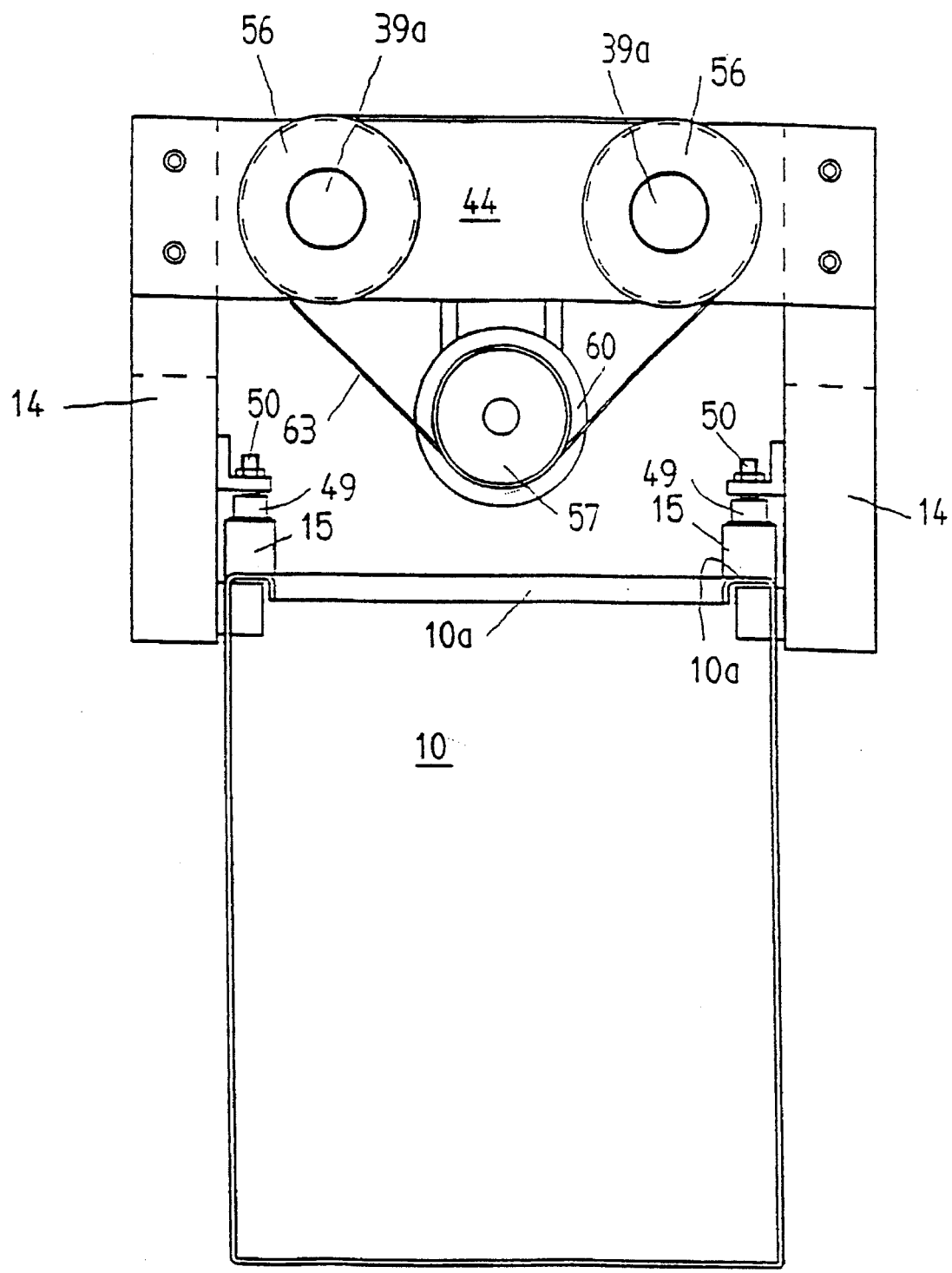
FIG. 20 is a sectional view through the mold closing unit according to line 20—20 of FIG. 17.

When applying a toggle mechanism it is indispensable to provide a mold height regulating means V, which permits a steady position of the closing direction s-s, if molds with different heights are used. For this purpose, a spindle drive 39 is provided, which according to FIG. 18 is supported at an abutment 44 and is in connection with the supporting element 13' by its threaded spindle 39a. Both spindle drives 39 can be each separately driven when the machine is adjusted, so that an exact parallel adjustment between movable mold carrier 12 and stationary mold carrier 11 is granted. In an operating state, both spindle drives are adjustable by a common drive 60. Via a pulley 57, the drive actuates two further pulleys 56 for the threaded spindles by means of one or several belts 63 (FIG. 20). From FIG. 18 it can be seen that the backlash of threads, which disturbs an exact summoning up of force, is suppressed by means of disk springs 45 held at a spacer.

Figure 23:
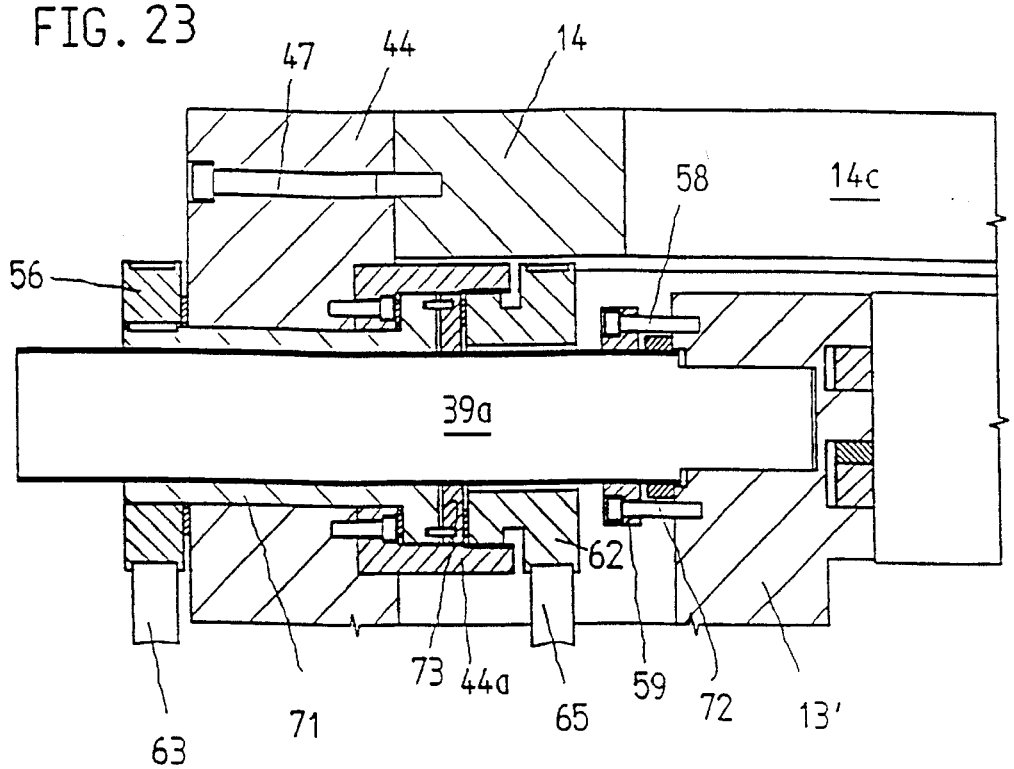
FIGS. 23 and 24 show a sectional view through a mold height adjusting unit of FIG. 17 in the area of a spindle drive at different mold heights.
Figure 24:
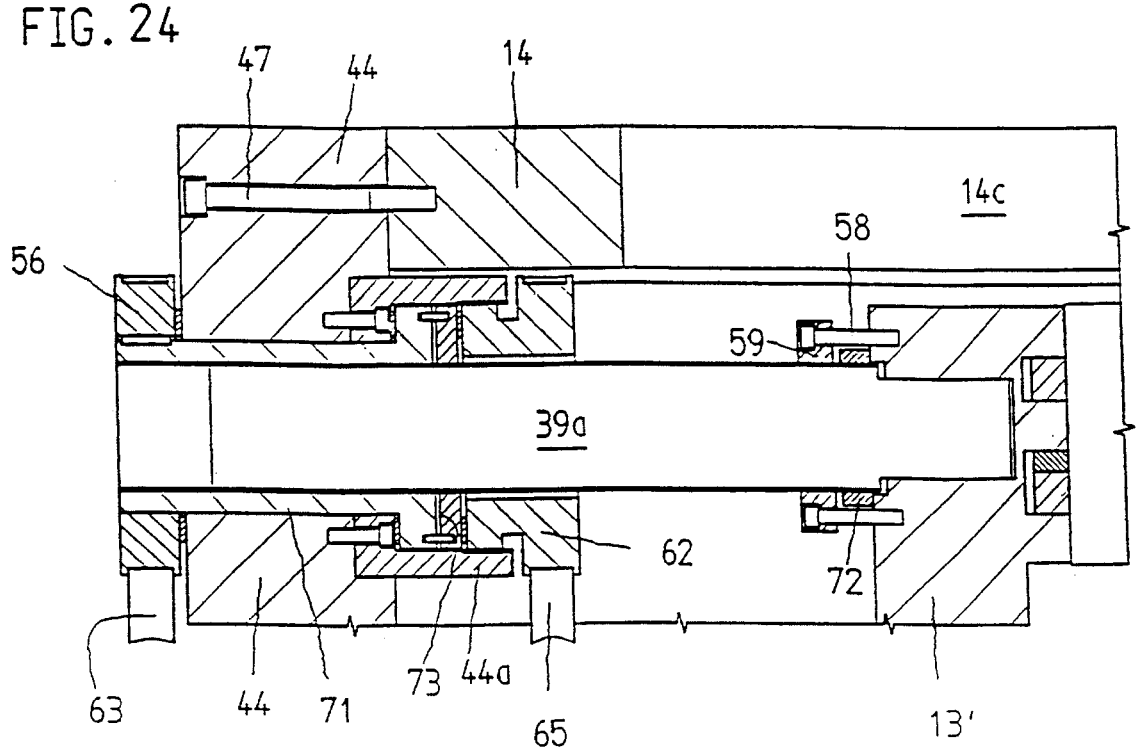

According to FIGS. 23–24, it is also possible to actuate threaded bushes 62, which are pulleys, by a second drive. The threaded bush 62 catches with its exterior thread into the thread of the spacer. In a detached condition, the pulley 56 can be actuated by the drive 60, which leads to an adjustment of the threaded spindle 39a. The nut 71 of the spindle drive is held in a bore hole of the abutment. After adjustment has been effected, the threaded bush 62 can be pressed in a direction to the spacer 44a by an opposed movement of the belt 63 of the second drive, so that the nut 71 is clinched by the threaded spindle 39a and the adjusting ring 73. The threaded spindle 39a is received in the supporting element 13' with backlash. The fixing is effected by tie bolts 58, which engage in a supporting ring 59. When tightening and so adjusting the tie bolts, the threaded spindle 39a is harnessed against the abutment 72.

It will be understood that the above description of the present invention is susceptible to various modifications, changes and adaptations, and the same are intended to be comprehended within the meaning and range of equivalents of the appended claims.

I claim:

1. An injection molding machine for processing synthetic materials, comprising:

a machine base;

a stationary mold carrier fixedly connected with said machine base;

a movable mold carrier connected with said machine base and being displaceable along a motion path, said movable mold carrier and said stationary mold carrier defining therebetween a mold clamping space;

a closing mechanism operatively connected to said movable mold carrier for moving said movable mold carrier along the motion path in a closing direction, and into and out of a closed position with said stationary mold carrier;

at least one force transmitting element deformable to compensate for forces generated when said mold carriers are in the closed position, said force transmitting element being separably connected to said closing mechanism;

a supporting element supported on said machine base, and being movable in the closing direction, said supporting element being arranged at said closing mechanism for supporting said closing mechanism, and being hinged to said stationary mold carrier by said force transmitting element; and a plurality of linking elements detachably connecting said force transmitting element to said supporting element and said stationary mold carrier, respectively, each said linking element comprising a plurality of exchangeable components movable relative to one another and located between said force transmitting element and said supporting element, and said force transmitting element and said stationary mold carrier, respectively, whereby the forces generated are transmitted to said force transmitting element through the respective exchangeable components, so that essentially only the exchangeable components are subjected to wear.

2. The injection molding machine defined in claim 1, wherein said machine base comprises a first part, and a second part movable relative to said first part; said stationary mold carrier being fixedly connected to said second part.

3. The injection molding machine defined in claim 1, wherein each said linking element comprises a stud respectively detachably mounted to said supporting element and said stationary mold carrier using screws, and a pillow block connected to a respective stud to form a linkage detachably mounted to said force transmitting element using additional screws.

4. The injection molding machine defined in claim 3, wherein said studs have a longitudinal axis, and are supported in respective recesses located in said force transmitting element, said supporting element and said stationary mold carrier; further comprising a plurality of bearing studs each perpendicularly arranged relative to a respective longitudinal axis, and each penetrating a respective stud, and being received within a respective bore located in said force transmitting element, said supporting element and said stationary mold carrier.

5. The injection molding machine defined in claim 1, further comprising a plurality of washer pieces each being insertable between a respective linking element, and said supporting element, said stationary mold carrier, and said force transmitting element, respectively, for altering a distance between said stationary mold carrier and said movable mold carrier.

6. The injection molding machine defined in claim 1, further comprising a driving device; wherein said closing mechanism comprises a toggle mechanism having a joining element supporting said driving device, and two holding elements each being pivotally linked at a link point to said movable mold carrier and said supporting element, respectively, and each being pivotally attached to said joining element so that said driving device is suspended therefrom.

7. The injection molding machine defined in claim 6, wherein said driving device comprises a quill drive having a ball rolling spindle at least partially received therein.

8. The injection molding machine defined in claim 6, wherein said force transmitting element is movable in the closing direction along said machine base, and movably supports said supporting element; further comprising an additional supporting element for movably supporting said force transmitting element and being located in a plane lying essentially perpendicular to the closing direction and through one of the link points.

9. The injection molding machine defined in claim 1, wherein said exchangeable components comprise a stud having an axis, and being detachably mounted to one of said supporting element and said stationary mold carrier using screws inserted into said stud perpendicular to the axis; a pillow block detachably mounted to said force transmitting element using additional screws, and supportably receiving said stud along respective surfaces thereof; and a tie bolt projecting through said stud along the stud axis and attaching said stud to said pillow block.

* * * * *